United States Patent
Segal

(10) Patent No.: US 11,488,363 B2
(45) Date of Patent: Nov. 1, 2022

(54) AUGMENTED REALITY CONFERENCING SYSTEM AND METHOD

(71) Applicant: Touchcast, Inc., New York, NY (US)

(72) Inventor: Edo Segal, New York, NY (US)

(73) Assignee: Touchcast, Inc., New York, NY (US)

(*) Notice: Subject to any disclaimer, the term of this patent is extended or adjusted under 35 U.S.C. 154(b) by 39 days.

(21) Appl. No.: 16/820,573

(22) Filed: Mar. 16, 2020

(65) Prior Publication Data
US 2020/0294317 A1 Sep. 17, 2020

Related U.S. Application Data

(60) Provisional application No. 62/858,143, filed on Jun. 6, 2019, provisional application No. 62/833,396, filed on Apr. 12, 2019, provisional application No. 62/832,751, filed on Apr. 11, 2019, provisional application No. 62/819,501, filed on Mar. 15, 2019.

(51) Int. Cl.
*G06T 19/00* (2011.01)
*H04N 7/14* (2006.01)
*G06N 20/00* (2019.01)

(52) U.S. Cl.
CPC ........... *G06T 19/006* (2013.01); *G06N 20/00* (2019.01); *H04N 7/142* (2013.01); *H04N 7/147* (2013.01); *H04N 2007/145* (2013.01)

(58) Field of Classification Search
None
See application file for complete search history.

(56) References Cited

U.S. PATENT DOCUMENTS

| | | |
|---|---|---|
| 6,020,931 A | 2/2000 | Bilbrey et al. |
| 7,216,092 B1 | 5/2007 | Weber |
| 7,577,978 B1 | 8/2009 | Wistendahl et al. |
| 8,508,614 B2 | 8/2013 | Segal |
| 8,584,164 B2 | 11/2013 | Walter et al. |
| 8,745,657 B2 | 6/2014 | Chalozin et al. |

(Continued)

FOREIGN PATENT DOCUMENTS

| | | |
|---|---|---|
| GB | 2 502 986 | 12/2013 |
| WO | WO 2010/141939 | 12/2010 |

(Continued)

*Primary Examiner* — Tapas Mazumder
(74) *Attorney, Agent, or Firm* — Leason Ellis LLP

(57) ABSTRACT

The disclosure provides an augmented reality virtual video-conference for each of a plurality of computing devices during a networked communication session. The networked communication session is defined and provided a plurality of devices. Video content that is at least partially captured by a camera associated with a respective device is received, and a composited interactive audio/video feed comprised of audio/video input received during the networked communication session from each of the first user computing device and at least the respective user computing device of the one of the additional users is generated. At least some of the video content captured by the camera associated with a respective user computing device is removed prior to including the remaining video content in the composited interactive audio/video feed. The composited interactive audio/video feed is provided to the plurality of computing devices during the networked communication session.

18 Claims, 30 Drawing Sheets

(56) References Cited

U.S. PATENT DOCUMENTS

| | | |
|---|---|---|
| 9,036,043 B2 | 5/2015 | Segal |
| 9,363,448 B2 | 6/2016 | Segal |
| 9,661,256 B2 | 5/2017 | Segal |
| 9,787,945 B2 | 10/2017 | Segal |
| 9,852,764 B2 | 12/2017 | Segal |
| 10,033,967 B2 | 7/2018 | Segal |
| 10,075,676 B2 | 9/2018 | Segal |
| 10,523,899 B2 | 12/2019 | Segal |
| 2001/0006382 A1 | 7/2001 | Sevat |
| 2002/0186233 A1 | 12/2002 | Holtz et al. |
| 2004/0015398 A1 | 1/2004 | Hayward |
| 2005/0137958 A1 | 6/2005 | Huber et al. |
| 2005/0204438 A1 | 9/2005 | Wang |
| 2006/0075668 A1 | 4/2006 | Sauer |
| 2006/0090141 A1 | 4/2006 | Loui et al. |
| 2007/0089134 A1 | 4/2007 | Stearns |
| 2007/0266322 A1 | 11/2007 | Tretter |
| 2008/0033806 A1 | 2/2008 | Howe |
| 2008/0096175 A1 | 4/2008 | Du Toit et al. |
| 2008/0109300 A1 | 5/2008 | Bason |
| 2008/0120675 A1 | 5/2008 | Morad et al. |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2009/0327418 A1 | 12/2009 | Zhang et al. |
| 2010/0083191 A1 | 4/2010 | Marshall |
| 2010/0174783 A1 | 7/2010 | Zarom |
| 2011/0052144 A1 | 3/2011 | Abbas |
| 2011/0161990 A1 | 6/2011 | Smith |
| 2011/0202827 A1 | 8/2011 | Freishtat |
| 2011/0249075 A1 | 10/2011 | Abuan et al. |
| 2011/0254912 A1 | 10/2011 | Mock et al. |
| 2011/0298935 A1 | 12/2011 | Segal |
| 2012/0158524 A1 | 6/2012 | Hintz |
| 2013/0031593 A1 | 1/2013 | Booth |
| 2013/0073985 A1 | 3/2013 | Hamlin et al. |
| 2013/0117129 A1 | 5/2013 | Brown et al. |
| 2013/0155187 A1 | 6/2013 | Skyberg |
| 2013/0173355 A1 | 7/2013 | Barcenas |
| 2013/0212615 A1 | 8/2013 | Schultz |
| 2014/0002581 A1 | 1/2014 | Bear et al. |
| 2014/0086557 A1 | 3/2014 | Yu et al. |
| 2014/0132702 A1 | 5/2014 | Leibovich et al. |
| 2014/0215542 A1 | 7/2014 | Terpe |
| 2014/0282220 A1* | 9/2014 | Wantland ............ G06F 3/04845 715/782 |
| 2014/0310287 A1* | 10/2014 | Bruso ................... G06F 9/5011 707/741 |
| 2015/0149930 A1 | 5/2015 | Walkin et al. |
| 2016/0080835 A1 | 3/2016 | von Sneidern et al. |
| 2016/0098941 A1 | 4/2016 | Kerluke |
| 2016/0373693 A1* | 12/2016 | Segal .................... H04N 21/47 |
| 2018/0150985 A1 | 5/2018 | McDonald |
| 2018/0276841 A1* | 9/2018 | Krishnaswamy .. G06K 9/00671 |
| 2019/0295321 A1* | 9/2019 | Neser ..................... G06T 19/20 |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

AUGMENTED REALITY CONFERENCING SYSTEM AND METHOD

CROSS-REFERENCE TO RELATED PATENT APPLICATIONS

This application is based on and claims priority to U.S. Provisional Patent Application Ser. No. 62/819,501, filed Mar. 15, 2019, which is incorporated by reference in its entirety as if expressly set forth herein. Further, this application is based on and claims priority to: U.S. Provisional Patent Application Ser. No. 62/832,751, filed Apr. 11, 2019; U.S. Provisional Patent Application Ser. No. 62/833,396, filed Apr. 12, 2019; and U.S. Provisional Patent Application Ser. No. 62/858,143, filed Jun. 6, 2019, each of which is incorporated by reference in its respective entirety as if expressly set forth herein. Further, this application incorporates by reference U.S. patent application Ser. No. 16/537,201, filed on Aug. 9, 2019 in its respective entirety as if expressly set forth herein.

FIELD

The present invention relates to networking, including in connection with one or more implementations for improving collaboration.

BACKGROUND

Despite the connectivity provided by the plethora of computing devices, communication devices, and networks, there remains a divide between the people using such devices and their actual presence.

Increasingly in the digital era, presence remains a technological challenge. People are together, but they are not together. This is caused at least in part by the limitations of the technology that people use. For example, during video conferences users' faces are often facing downward while they are looking at phones, which contributes to feelings of isolation and disconnect. People meeting virtually with others using contemporary remote access solutions do not always share a sense of presence, but due to limitations in technology.

BRIEF SUMMARY

The disclosure provides an augmented reality virtual videoconference for each of a plurality of computing devices during a networked communication session. The networked communication session is defined and provided a plurality of devices. Video content that is at least partially captured by a camera associated with a respective device is received, and a composited interactive audio/video feed comprised of audio/video input received during the networked communication session from each of the first user computing device and at least the respective user computing device of the one of the additional users is generated. At least some of the video content captured by the camera associated with a respective user computing device is removed prior to including the remaining video content in the composited interactive audio/video feed. The composited interactive audio/video feed is provided to the plurality of computing devices during the networked communication session.

In one or more implementations, the disclosure provides receiving, by the at least one processor, initialization information from at least one user computing device, wherein the initialization information includes video content captured by a camera associated with the at least one user computing device.

In one or more implementations, the disclosure provides processing, by the at least one processor, the initialization information to detect objects and corresponding information associated with the detected objects.

In one or more implementations, the detected objects and corresponding information include at least one plane of the object.

In one or more implementations, the disclosure provides using, by the at least one processor, machine learning to process the initialization information.

In one or more implementations, the machine learning can be implemented for at least image processing.

In one or more implementations, the disclosure provides providing, by the at least one processor, an augmented reality view of the remaining video content in the composited interactive audio/video feed as a function of movement of a viewer of the composited interactive audio/video feed.

In one or more implementations, the augmented reality view includes adjusting for skew and angle of view.

In one or more implementations, at least one of the additional user computing device(s) communicate on the networked communication session via one or more of Real Time Streaming Protocol, Web Real-Time Communication and/or hypertext transport protocol live streaming.

In one or more implementations, the disclosure provides receiving, by the at least one processor, from the additional user computing devices information representing an interaction by the one of the user computing devices; and providing a representation of the interaction to each other user computing device.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
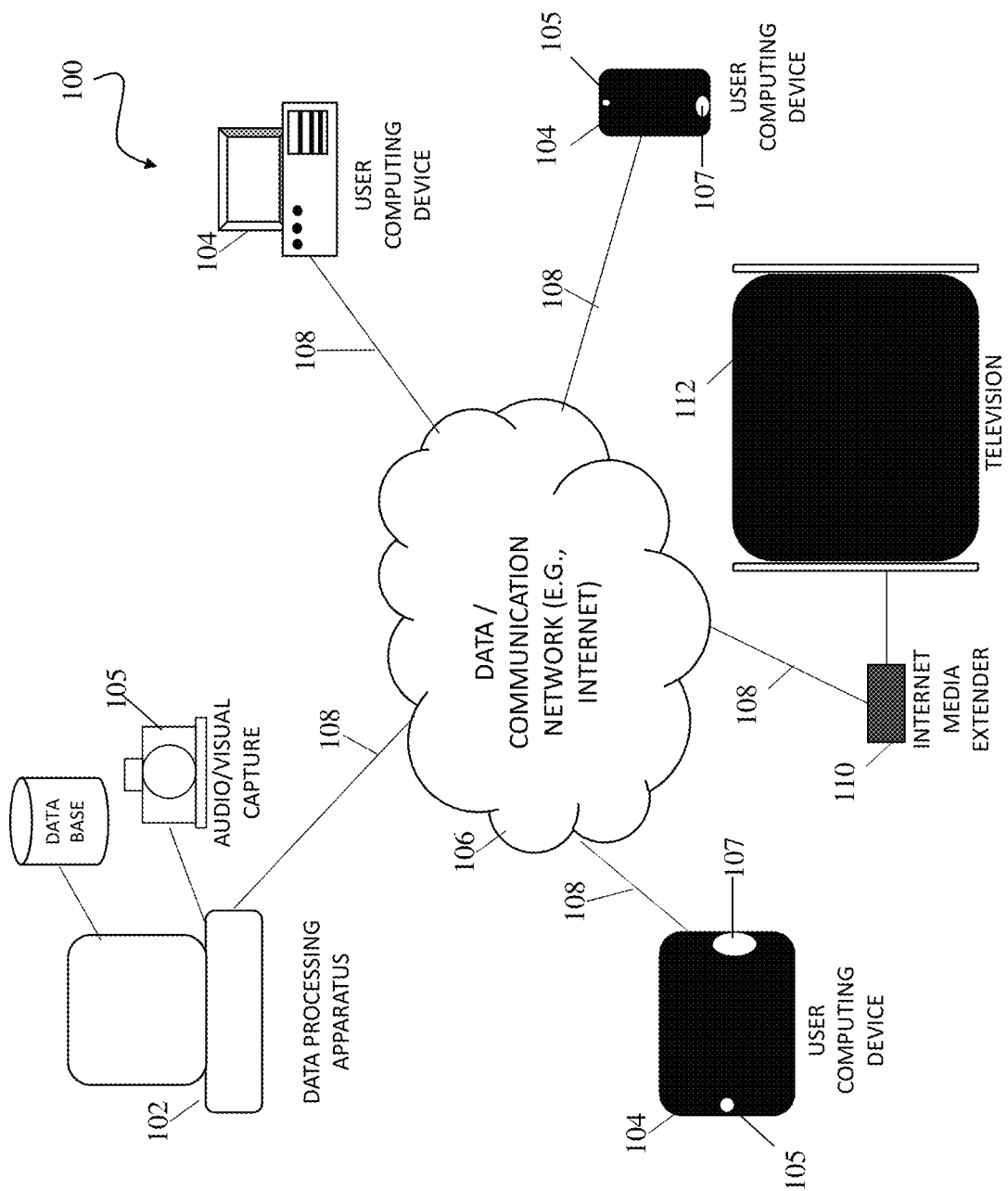
FIG. 1 is a diagram illustrating an example hardware arrangement that operates for providing the systems and methods disclosed herein.

By way of summary and introduction, the present disclosure includes a plurality of technological features, vis-à-vis user computing devices that are specially configured with hardware and software modules. During an interactive, on-line video conference, the devices operate and interact in physical and/or virtual reality environments, and include augmented reality. For example, one or more computer-generated images can be superimposed on live video content and can affect at least one device's view of the real world.

In this way, a composited interactive experience is provided, including by supplementing live video content with audio/visual content for users to experience a real-world environment that is augmented by computer-generated content. The present disclosure solves technological shortcomings associated with user engagement and presence.

In one or more implementations of the present disclosure, numerous forms of deep learning for computing device(s) are supported, based on various data representations that are or have been used for training. For example, deep learning architectures, such as deep neural networks, deep belief networks, and recurrent neural networks, can be applied to computer vision, speech recognition, natural language processing, audio recognition, social network filtering, machine translation, image analysis, and inspection of physical elements to provide augmented reality in an interactive video conferencing and other environment. Deep learning processes can be implemented to extract features of a respective physical environment, such as to detect aspects thereof, such as tables, televisions, whiteboards, computers, and other various objects. The detected elements can be extracted and transformed, including to provide a composite representation of the physical environment therewith.

In one or more implementations, the present disclosure provides for interactive remote video conferencing that is enhanced by augmented reality and/or virtual reality. A virtual interactive platform is presented that creates the same sensory illusion for a person who is not physically present somewhere, such as in a conference room, with someone who is physically sitting in that location. The present disclosure can use one or more deep learning capabilities during an on-line video conference to process audio-visual content from a device operated by the remotely located person substantially in real-time to extract the person from the background. Thereafter, such as by using a collaboration stack, e.g., the TEAMTIME collaboration stack, the remotely located person can be rendered to appear placed in the same room, and around the same conference table, with other person(s) who are physically located in the room. This provides a realistic impression as though the people, including the physically located person(s) and one or more remotely located person(s), are all physically meeting together. This accomplishes a sense of presence that is unprecedented and allows people to feel like they truly meet each other and collaborate.

In one or more implementations, augmented reality headgear can be worn by users to experience an augmented reality video conference session of the present disclosure, including to experience audio, visual, and other content provided via augmented reality. Alternatively (or in addition), one or more audio/visual projection systems can be used for providing virtual representations of an on-line video conference session that appears as though remotely located person(s) are in the same location, e.g., around a conference table, with person(s) who are physically at the location.

Using deep learning and other machine-learning, artificial intelligence, and/or other techniques, various real-world objects such as tables, whiteboards, televisions, and computers can be measured and used by the present disclosure for users to see, hear, virtually navigate, interact with, manipulate, and otherwise use. For example, as a number of people physically sit at a conference room table, others who are located remotely and captured in video, can virtually sit with them.

In operation, one or more masks, as known in the art, can be applied to images of person(s) who are located remotely from a physical location, and the images can be processed such that background and other content is removed and the individuals are virtually extracted therefrom. Thereafter, using measurements, the extracted content (e.g., the people) can be placed in images of the physical environment, such as in chairs, standing around whiteboards, or the like. One or more processors can be configured by executing instructions on processor-readable media, such as non-transitory processor-readable media, to carry out features and functionality shown and described herein. For example, images can be processed to detect various objects, including planes of such objects that have been determined by deep learning or other techniques. Alternatively, or in addition, a graphical user interface can include graphical controls for users to identify and/or select respective objects in a room and define aspects associated with the objects. For example, selection tools can be used to outline or otherwise define specific objects, and information representing such objects can be generated for use in providing the teachings herein.

The systems and methods of the present disclosure can include a form of initialization, whereby a location such as a room is photographed by an imaging device, such as a camera, associated with the user computing device. For example, a user points a camera associated with the user computing device at a location and/or around a room prior to or during an online video conference. One or more software modules executed by one or more processors cause the processor(s) to process video content as a function of the initialization, and to detect specific objects and corresponding information, such as a table and where the table is located, the plane of the table is, where chairs are situated, and which chairs are occupied, or the like. Thereafter, virtual representations of remotely located people can be placed in the scene, such as at the table in the room in places that are not occupied by people physically located in the room (or already located remotely and placed in the room virtually). The virtual representations of people (e.g., digital avatars) can be placed in respective locations where they can remain in a persistent basis throughout the on-line virtual videoconference session.

Moreover, the present disclosure supports semantic segmentation, enabling a direct connection of pixel(s) in an image to one or more of a particular category, i.e., a chair, human, desk, table, whiteboard, screen display, or the like. In one or more implementations, bounding boxes or specific selections of pixels are used to link such classes of represented images. Thereafter, such objects can be masked and/or replaced with augmented reality, including to replace displays, humans, or virtually anything with a virtual representation of something or someone.

In one or more implementations, physical objects, such as whiteboards, can be automatically detected and an interactive collaborative whiteboard can be virtually overlaid in its place. Alternatively (or in the same implementation, users can place a virtual surface showing a whiteboard or to share screen in 3-D representation of space of a room.

Thus, one or more scans of a room can result in detection of physical articles and people, such as a whiteboard, and such scans can be used to define and implement a further augmented layer. Additionally, one or the display screens in the room can be detected and virtually replaced by a shared screen component from any participant's computing device in the meeting. As a user writes or draws on a virtual (e.g., digital) collaborative whiteboard, the respective strokes automatically appear on the virtually represented physical whiteboard when viewed via a device capable of providing an augmented reality view, such as by a user wearing a virtual reality headset or glasses, or when provided on a display screen. Furthermore, when a person who is physically located with the physical whiteboard physically writes or draws on the whiteboard, such as with a dry erase marker, a view of the whiteboard can be captured, such as by a camera. Thereafter, software executing by one or more processor(s) configures the processor(s) to update the virtually represented whiteboard such that the new writings/drawings can be displayed, such as by and registered with the digital board.

Thus, the present disclosure can process video content to alter the video to include configured (e.g., sized and manipulated) representations of people for placement in particular places, such as in chairs. Individuals can appear to be placed in physical environments as a function of augmented reality, and/or placed in virtual locations as a function of virtual reality. The result includes improved collaboration on a scale and format that was heretofore not possible.

Referring to FIG. 1, a diagram is provided that shows an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high quality and interactive multimedia content, and supporting interactive video conferencing.

With continued reference to FIG. 1, data processing apparatus 102 can be configured to access one or more databases for the present disclosure, including image files, video content, documents, audio/video recordings, metadata and other information. However, it is contemplated that data processing apparatus 102 can access any required databases via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In addition, system 100 can include Internet media extender 110 that is communicatively coupled to television 112, such as via a high-definition multimedia interface ("HDMI") or other connection.

According to an embodiment of the present disclosure, user computing device 104 provides user access to data processing apparatus 102 for the purpose of receiving and providing information. The specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
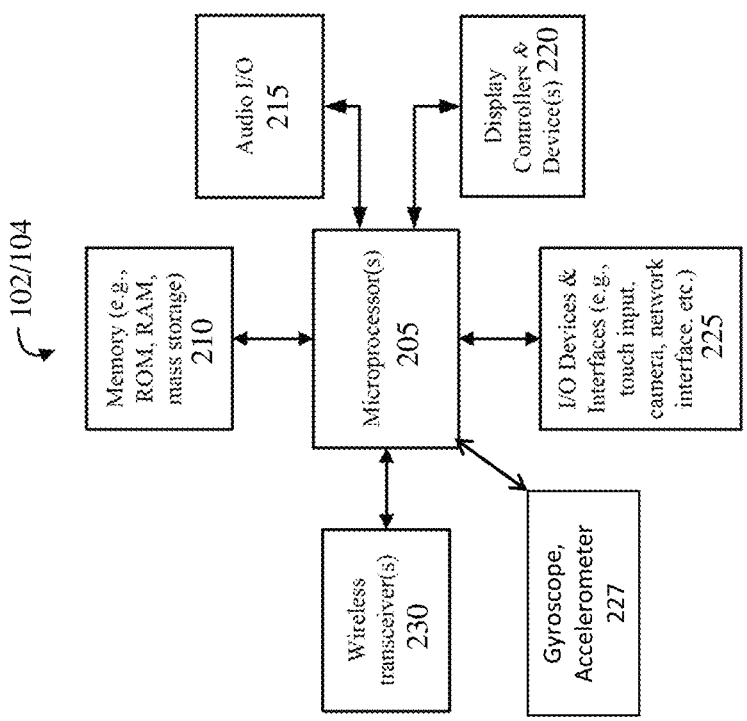
FIG. 2 is a block diagram that illustrates functional elements of a computing device in accordance with an embodiment.

FIG. 2 illustrates, in block diagram form, an exemplary data processing apparatus 102 and/or user computing device 104 that can provide various functionality, as shown and described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type. The data processing apparatus 102 and/or user computing device 104 also includes an audio input/output subsystem 215 which may include one or more microphones and/or speakers.

A display controller and display device 220 provides a visual user interface for the user; this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, to receive output from, and/or to transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

Additional components, not shown, can also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present disclosure provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present disclosure, at least in part, for establishing and controlling media sessions between various end points, including user computing devise 104, Internet media extender 110 and data processing apparatus 102.

In addition to RTSP, one or more implementations of the present disclosure can be configured to use Web Real-Time Communication ("WebRTC") to support browser-to-browser applications, including in connection with voice, video chat, and peer-to-peer ("P2P") file sharing. Thus, the present disclosure avoids a need for either internal or external plugins to connect endpoints, including for voice/video or other communication sharing. In one or more implementations, the present disclosure implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conferencing at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present disclosure can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
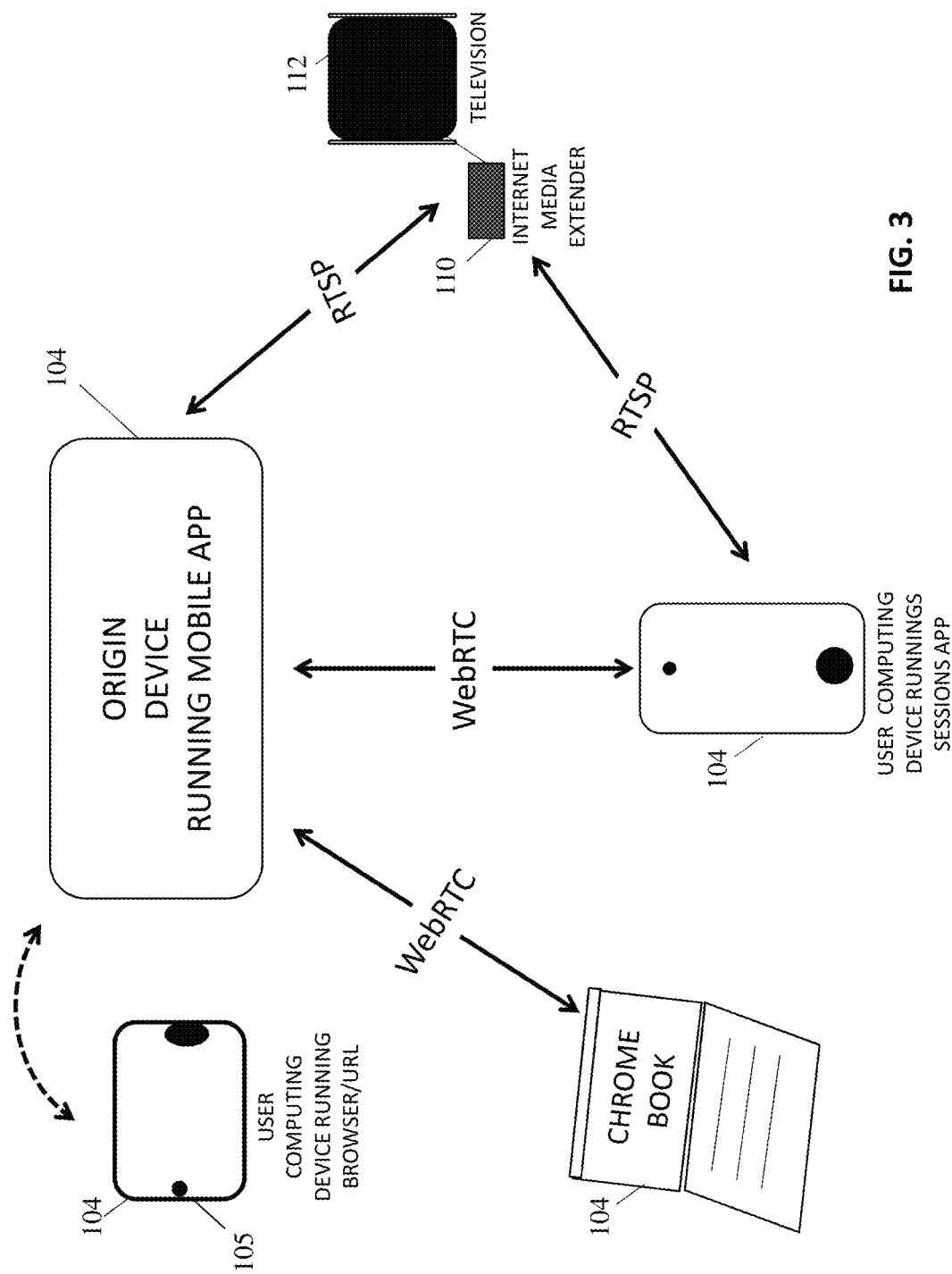
FIG. 3 is an example high-level diagram that illustrates interactivity between various ones of the devices illustrated in FIG. 1.

FIG. 3 is an example high-level diagram that illustrates interactivity between various ones of the devices illustrated in FIG. 1 and identifies example communication protocols in one or more implementations of the present disclosure. The implementation illustrated in FIG. 3 is usable as a consumer (e.g., a residential) implementation, as well as an enterprise implementation. As illustrated in FIG. 3, WebRTC is shown with regard to communications between user computing devices 104 (shown as a CHROME BOOK and mobile computing device, e.g., a smart phone) and supporting browser-to-browser applications and P2P functionality. In addition, RTSP is utilized in connection with user computing devices 104 and Internet media extender 110, thereby enabling presentation of audio/video content from devices 104 on television 112.

In one or more implementations, HTTP Live Streaming ("HLS") is utilized for HTTP-based media streaming. In addition or in the alternative, adaptive bit rate HLS is utilized, thereby enabling a portion of the stream is available in a plurality of encoding sizes and resolutions for effective receipt regardless of device or bandwidth. As known in the art, HLS is a usable to parse a stream into a sequence of small HTTP-based file downloads, each download comprising a portion of the stream. As the stream plays, a client device can select from a number of different alternate streams containing the same material encoded at a variety of data rates, allowing the streaming session to adapt to an available data rate. A M3U playlist containing the metadata for the various sub-streams which are available for download is also provided and downloaded.

In the example illustrated in FIG. 3, a respective computing device 104 is illustrated as the origin or host (also referred to herein, generally, as a "presenter" device) that is executing the MOBILE APP and defining a session for respective other devices to use for, for example, interactive video conferencing. In one or more implementations, the origin or host device 104 establishes an initial session and options are provided to invite other users (e.g., user computing devices 104 that are configured with the MOBILE APP) to join the conferencing session. Users who are invited to join the session can further invite other users, for example, when permission for extending invitations to other users has been made available (e.g., enabled) by the origin or host device. Accordingly, the MOBILE APP can include instructions for enabling a processor associated with each respective user computing device 104 to generate and transmit invitations for users to join a respective conferencing session. In accordance with the present disclosure, video sharing, video conferencing, sharing of multimedia content, data, documents and various files is supported, as shown and described in greater detail herein.

In one or more implementations, a plurality of interactive communication sessions can be defined by an origin or host device. Each of the respective sessions can be defined and identified using a specific title or label. For example, "#APPDEV" can be used to define and identify an interactive communication session having a topic dedicated to software application development. The origin or host device can, thereafter, transmit invitations to computing devices 104 associated with software engineers and other relevant parties to join the #APPDEV session. Videoconferencing technology in accordance with the present disclosure is, thereafter, available for the software engineers and other relevant parties and the user of the origin or host device 104, such as to confer over topics associated with software application development. Similarly, the same respective origin or host device 104 can define another respective session with a different topical focus, e.g., sales and entitled #SALES. Invitations to the #SALES session can be transmitted by the origin or host device to computing devices 104 associated with individuals in a sales and marketing department. Videoconferencing technology in accordance with the present disclosure is, thereafter, available for those one or more individuals to confer about topics associated with sales. In one or more implementations, at least part of the respective groups of users is mutually exclusive, in that members of the "#APPDEV" session cannot participate in the #SALES session, and at least some of the members of the #SALES session cannot participate in the #APPDEV session.

In operation, and in accordance with one or more implementations, after an invitation is sent to a user of a computing device 104 for joining a session defined by a respective topic (e.g., #TOPIC), the user affirmatively accepts the invitation and is, thereafter, authorized to join the session. Thereafter, the user can select, via the MOBILE APP, an identifier representing the respect session (e.g., #TOPIC) provided, which causes the user computing device 104 to execute one or more instructions that enable the device 104 to connect to and/or join the session, and access materials associated therewith. Moreover, in one or more implementations rules can be defined and/or enforced that restrict access to sessions and/or content to respective users. For example, a session defined as #TOPIC may be shared by seven users, however rules can be defined by a user of the origin or host computing device 104 and implemented that restricts all but three of the users from real-time video conferencing via the #TOPIC session. Content associated with the #TOPIC session, however, can be made available to all seven of the users. Materials associated with a respective session can be stored (e.g., backed up) remotely, e.g., in the "cloud" and be available for access, archived and/or made available for users in the future. Such control can, be restricted from future access, as well.

It will be appreciated by one of ordinary skill that countless sessions can be defined for topics of all sorts and usable for respective groups of users. Demarcating individual sessions in accordance with the present disclosure is usable in the consumer and enterprise markets alike, and solves a long felt need associated with controlled communication sessions including interactive video among respective individuals and parties.

In certain implementations, a plurality of parties can connect to a respective videoconferencing session in accordance with the present disclosure. In such instances, a client/server model can be effective for handling the respective devices and management of data and communications thereof. In other certain implementations, one or a few individuals connect to a respective videoconferencing session in accordance with the present disclosure. In such cases, a P2P framework can be effective in an implementation.

Figure 4:
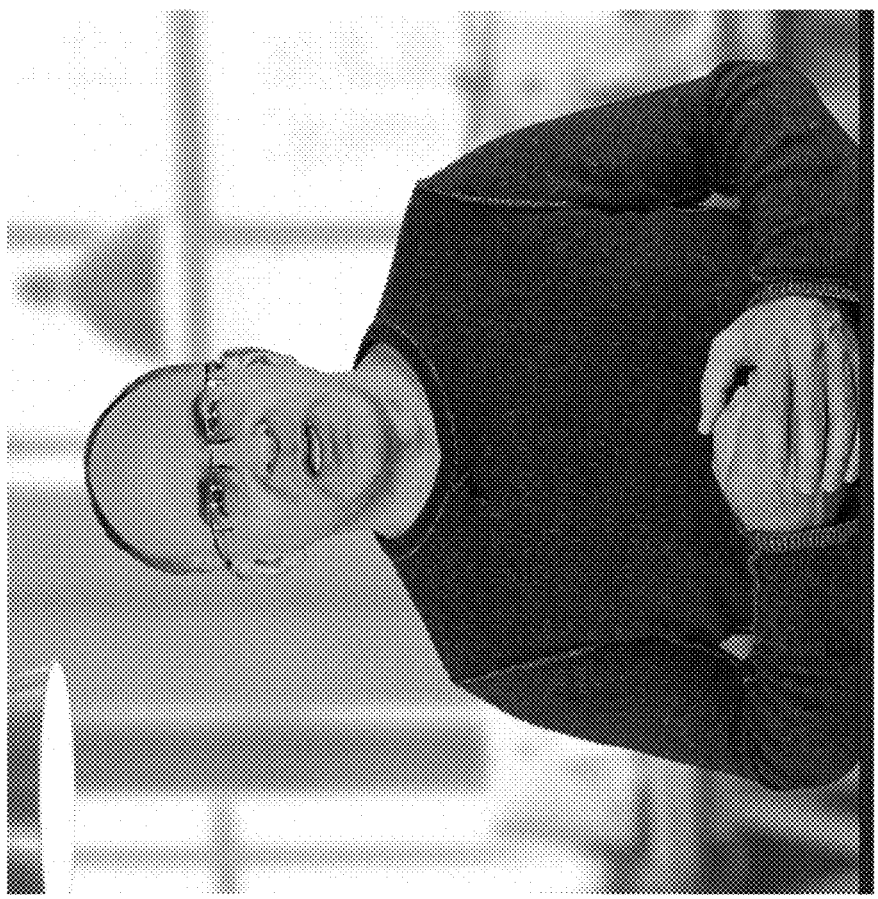
FIGS. 4-19D illustrate implementations of the present application.

FIGS. 4-15 illustrate example implementations of the present disclosure. FIG. 4 illustrates an example user speaking and being captured in images by a respective device, e.g., user computing device 104. In the example shown in FIG. 4, the user is located in a room in front of several windows, a lamp, and tables. The user is remote from a physical conference room where other participants are physically located, and the user is participating virtually via an online video conference in accordance with the teachings herein.

Figure 5:
Figure 6:
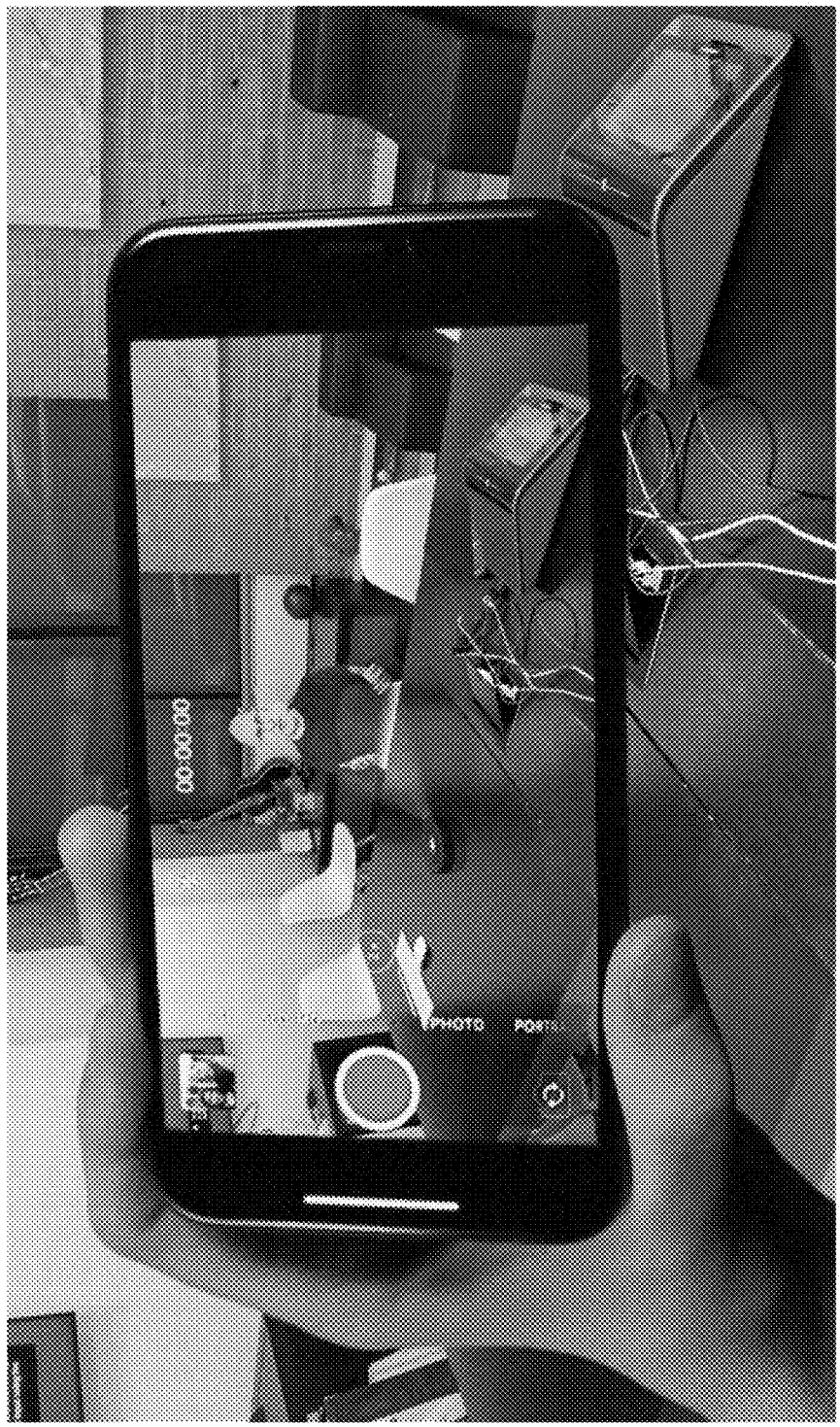

FIGS. 5 and 6 illustrate the physical conference room that is remotely located from the user, and a user computing device 104 operated by a user who is physically located in the conference room. An augmented reality version of the conference room is displayed in the user computer device 104, and the remotely located user is shown as if physically seated at the table in the conference room. More particularly, elements that were captured in FIG. 4, such as the background elements (windows, lamp, tables, etc.) have been removed and the user has been extracted therefrom. This provides a more realistic view of the user as if being physically present and located in the conference room.

Figure 7:
Figure 8:
Figure 9:
Figure 10:
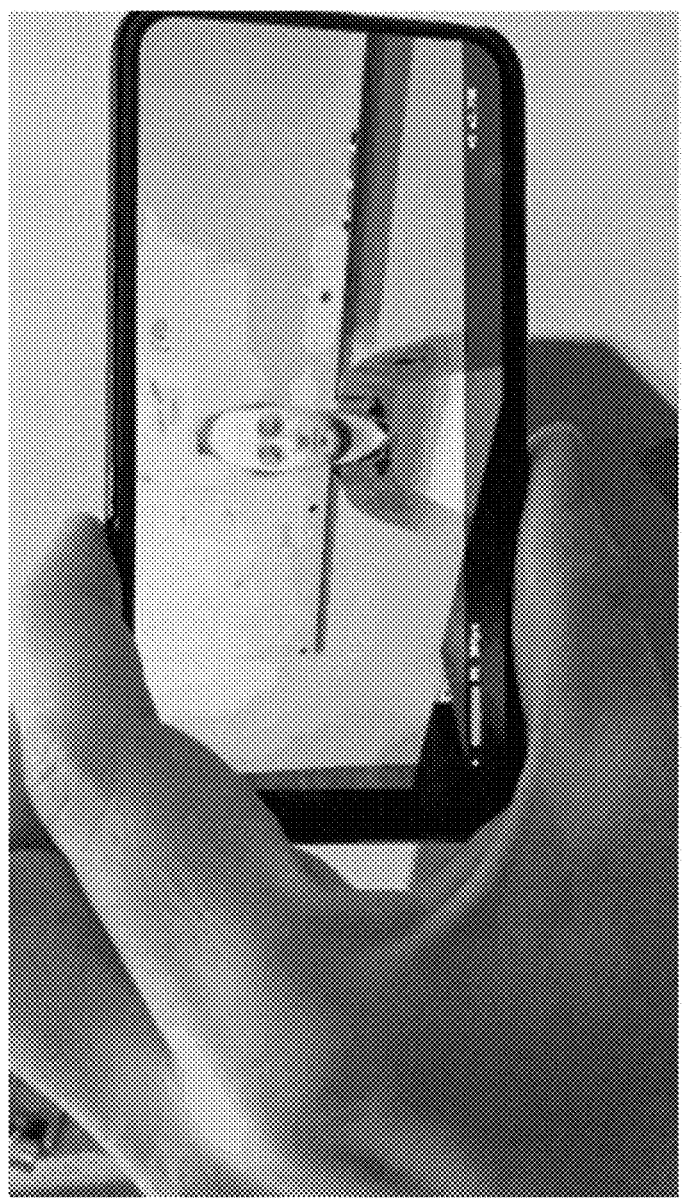
Figure 11:
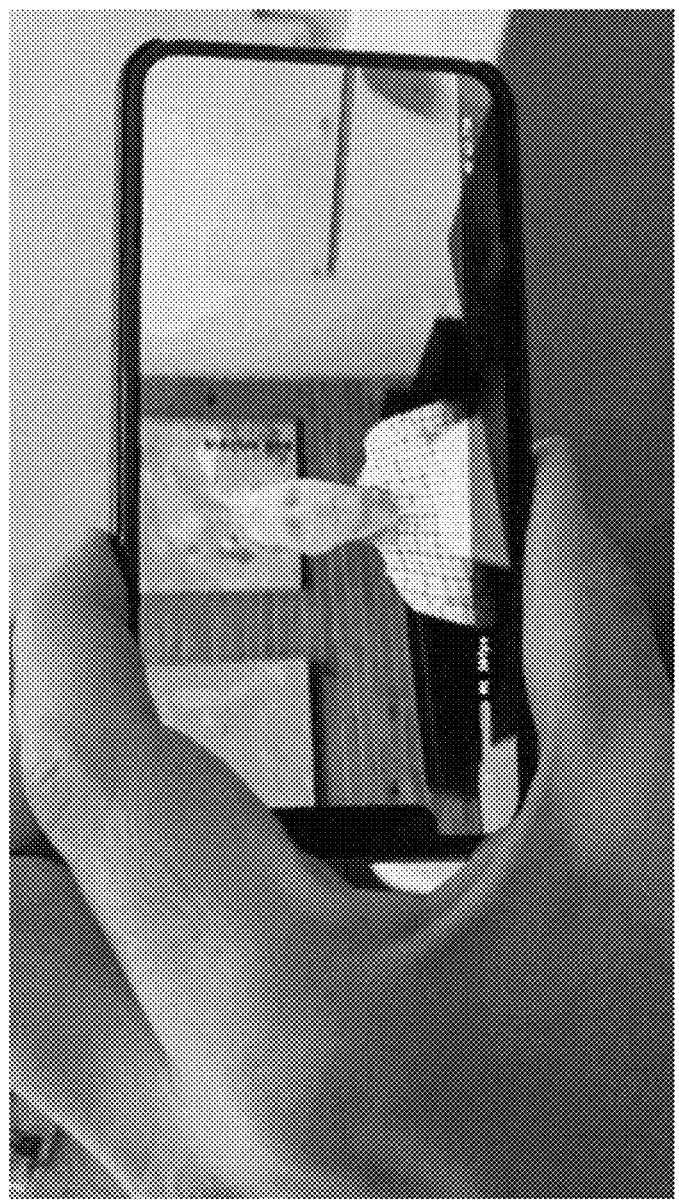

FIGS. 7-9 show the user appearing seated at the table, and demonstrates the versatility of the present disclosure. In the views shown in FIGS. 7-9, the distance and angle of view changes as the user who is physically located in the conference room moves about while continuing to capture video content of the conference room. Even though the angle of view and distance changes, the position of the remotely located user is virtually represented consistently. This can be accomplished as a function of one or more instructions being executed by one or more processors to provide augmented reality and altered video content as a function of a determination of the location of the respective seat in which the remotely located user appears to be sitting. Representing the remotely located user in this way provides for substantially greater realism, even as the user computing device 104 operated by the user who is physically located in the conference room moves about the location.

For example, a person viewing an augmented reality of a virtually placed participant in a conference room moves about. During that movement, images of the virtually placed participant adjusts, such as with regard to an appropriate skew and angle. In this way, the virtually placed participant appears as (s)he would as if the participant was physically located in the conference room. This transformative action can occur for anything seen in the virtual conference, including objects. In one or more implementations, similar transformations can occur with audio content, such as to adjust volume, distortion, echo (or reverb), or the like, to virtually represent an audio experience for a user.

FIGS. 10-13 illustrate an example implementation in which an additional two remotely located persons are shown virtually sitting next to each other at the conference room table shown in FIGS. 5-9, as a function of augmented reality.

Figure 12:
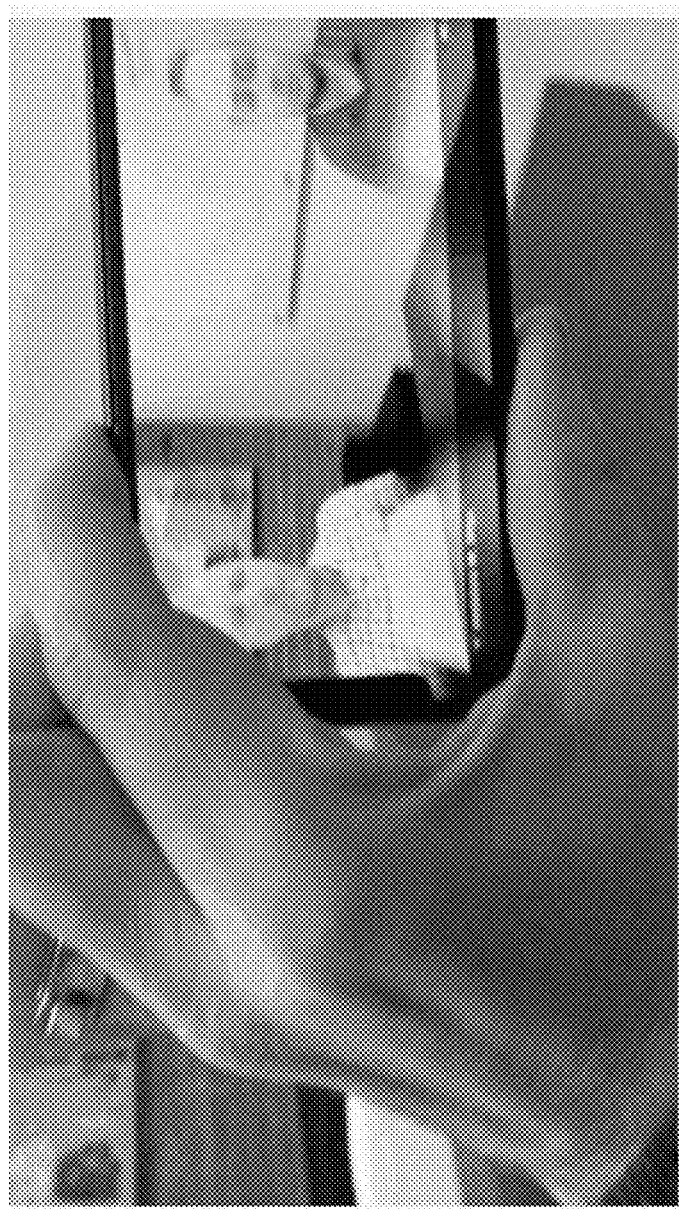
Figure 13:
Figure 14:

FIG. 14 illustrates an example implementation in which the additional two remotely located persons shown in FIGS. 10-13 are shown virtually sitting at a conference room table, while other persons who are physically present in the conference room appear with them. This demonstrates an example of the present disclosure integrating people who are physically located in a conference with those who are located remotely. As can be seen, the respective users appear as they would as if physically present, naturally and realistically.

Figure 15:
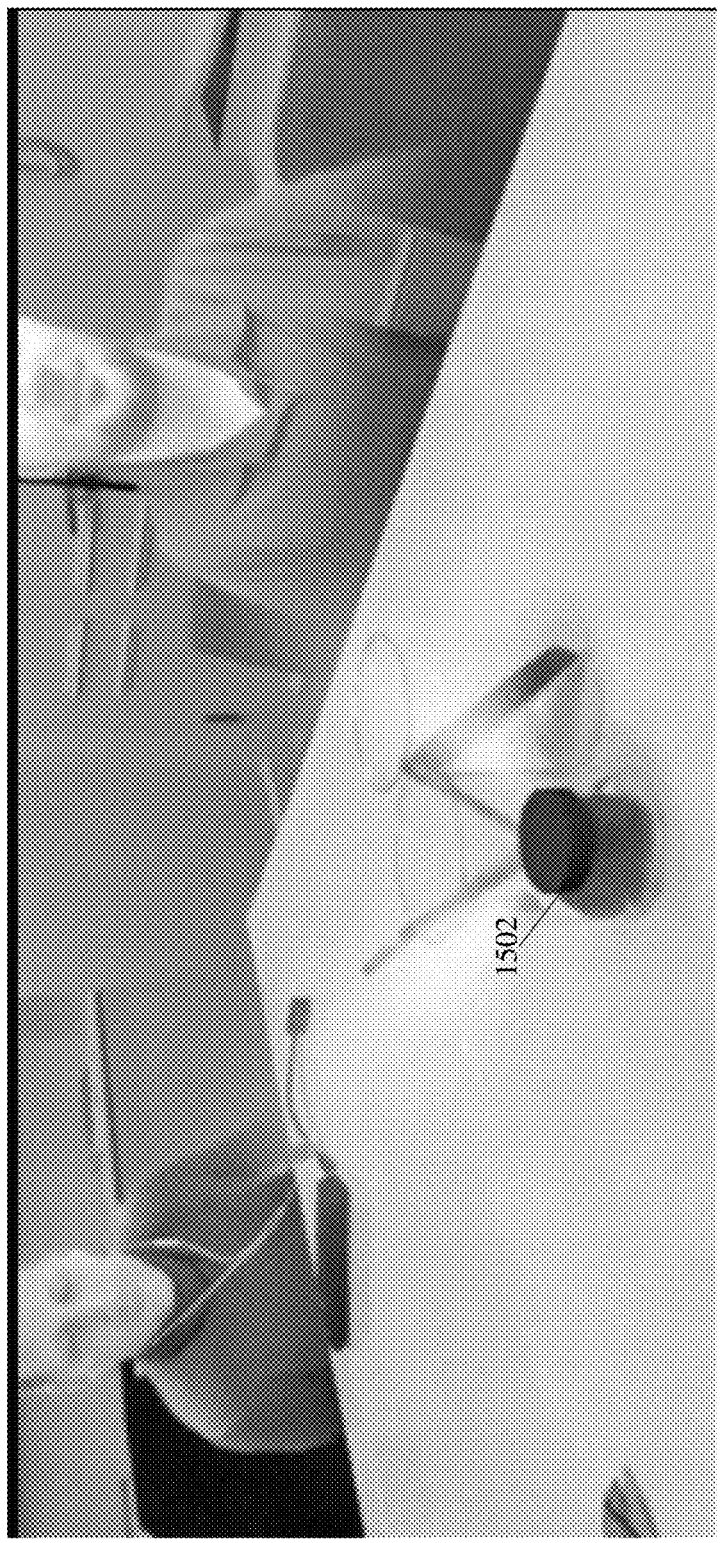
Figure 16A:
Figure 16B:
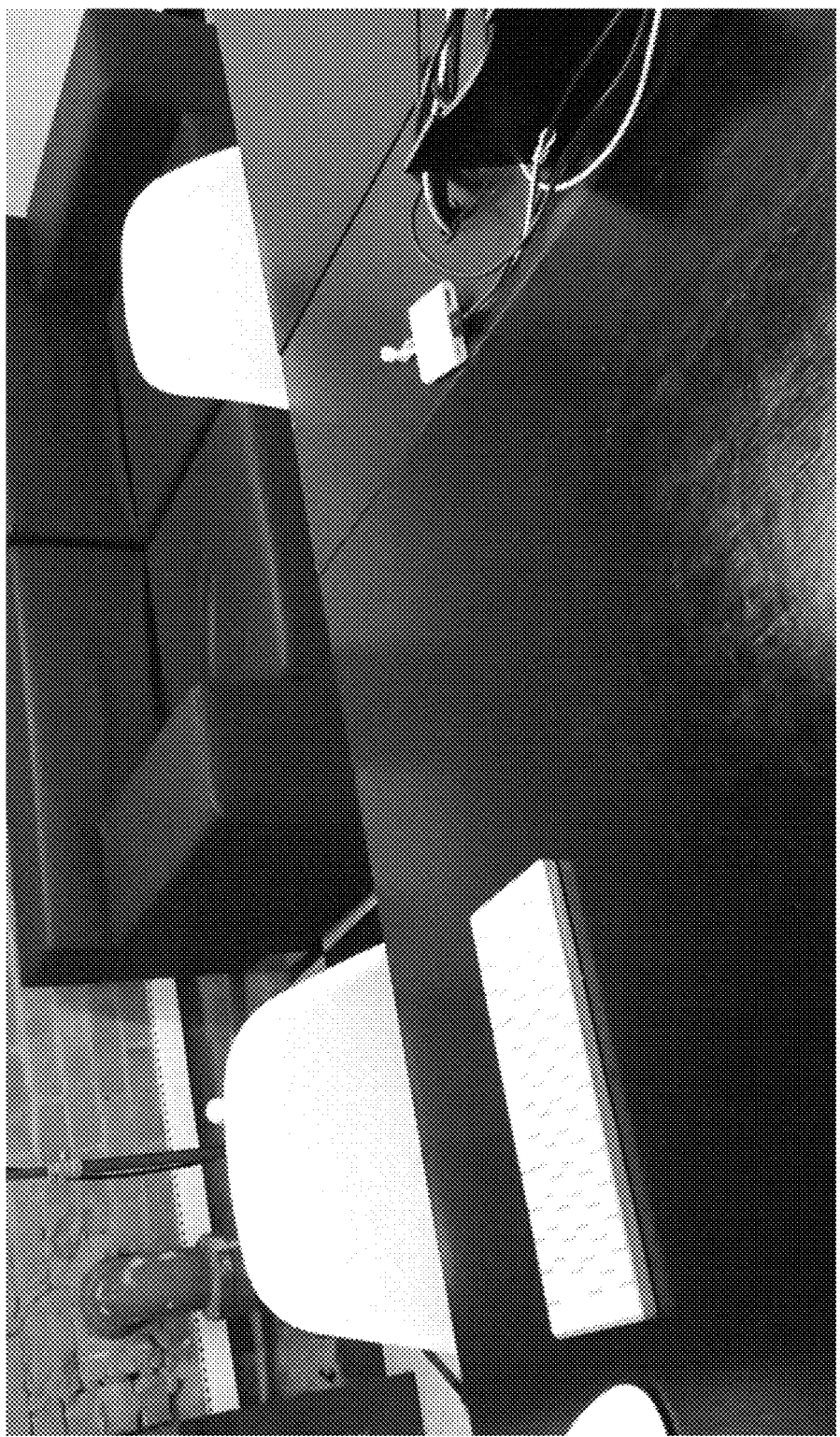

FIG. 15 illustrates an example implementation of the present disclosure that includes virtual projector 1502 that appears to project representations of the remotely located persons of FIGS. 12 and 13. FIGS. 16A-16B illustrate an example implementation of the present disclosure. FIG. 16A includes the virtually provided projector 1602 that is usable to illustrate projected representations of a remotely located person. As shown in FIG. 16A, a computing device provides the augmented reality version of the conference room with a remotely located participant represented vis-à-vis the virtual projection device 1602. FIG. 16B illustrates the conference room in its actual, physical form. In FIG. 16B, no computing device is shown providing the augmented reality version, hence the projection device 1602 and participant are not shown as those were virtually presented as a function of augmented reality.

Figure 17A:
Figure 17B:
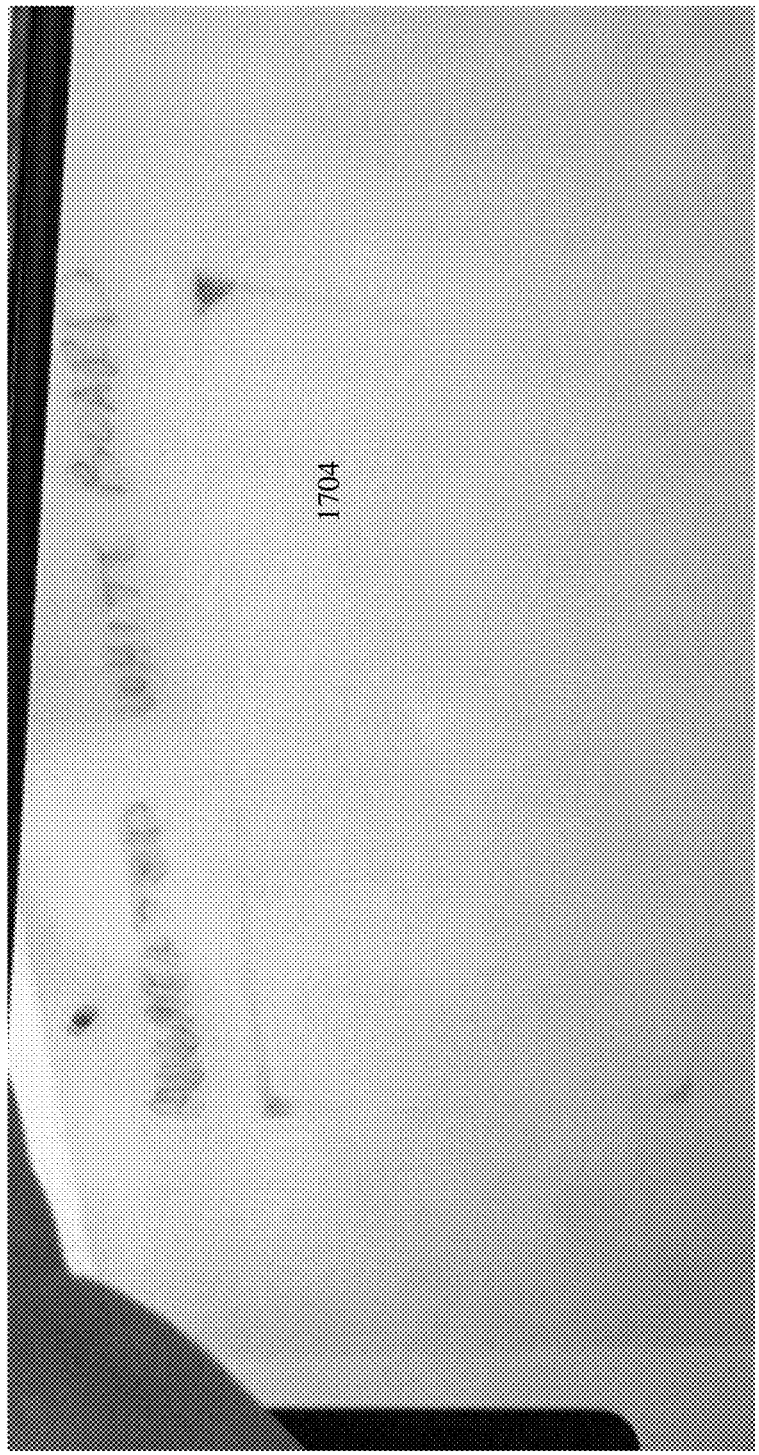
Figure 17C:
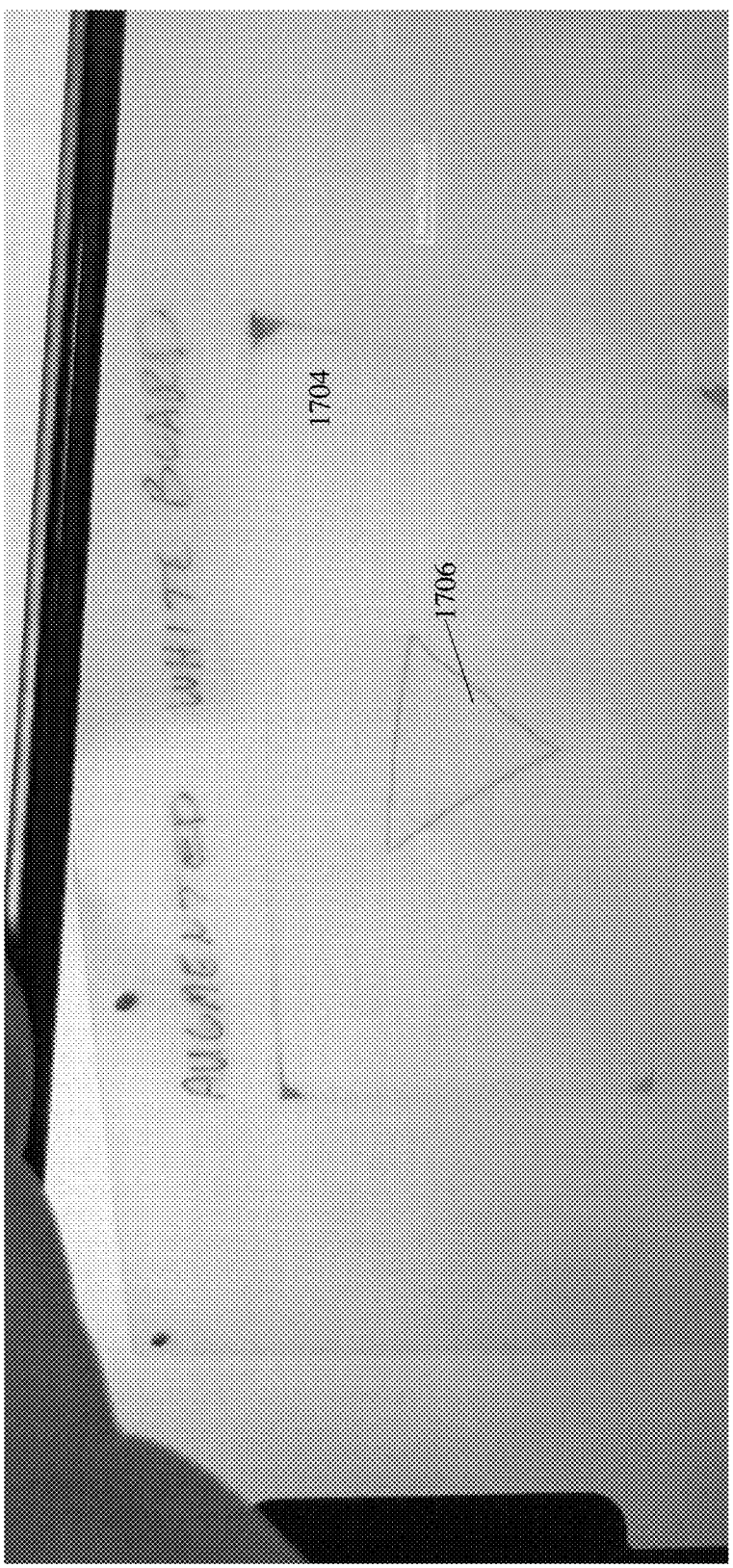
Figure 17D:
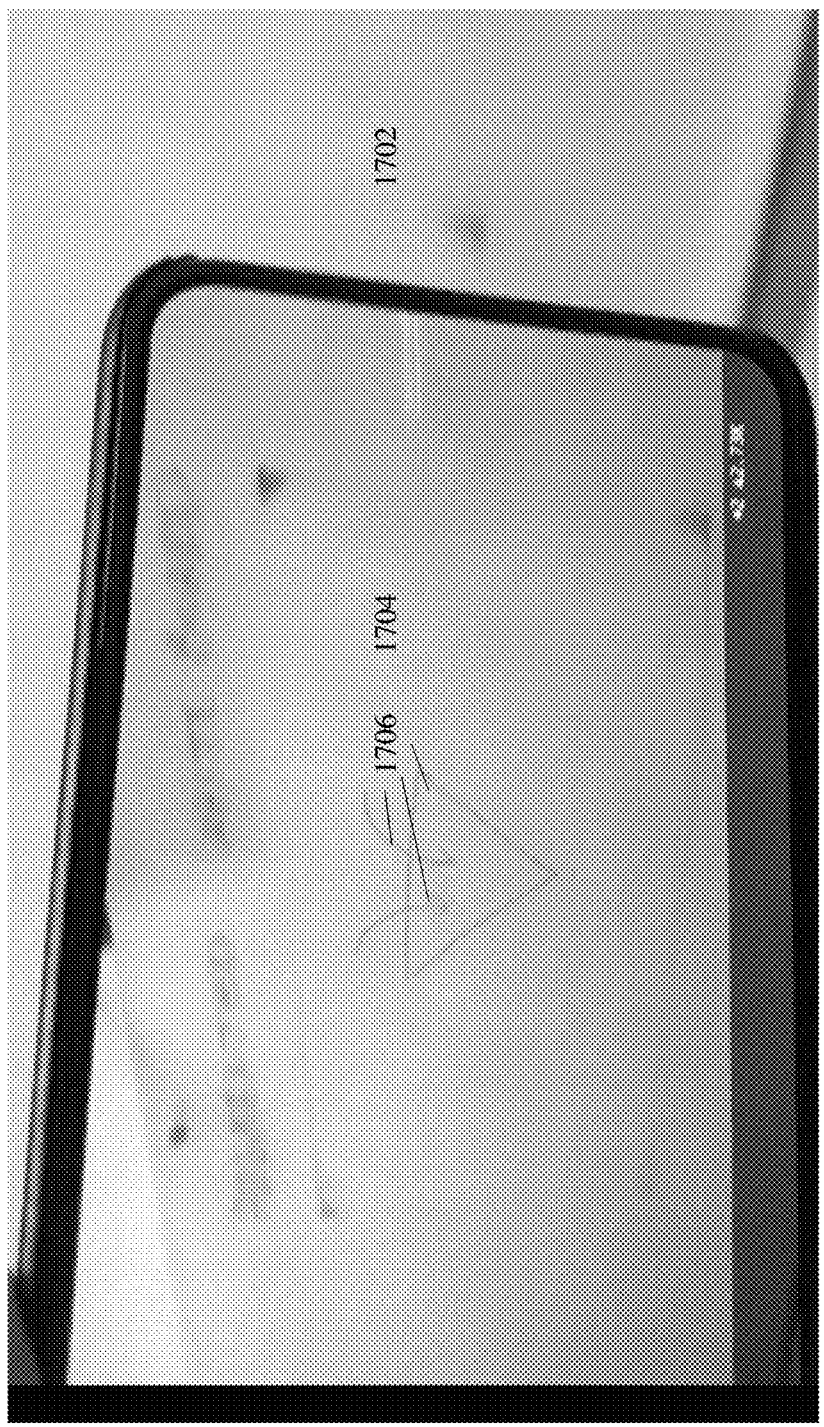
Figure 17E:
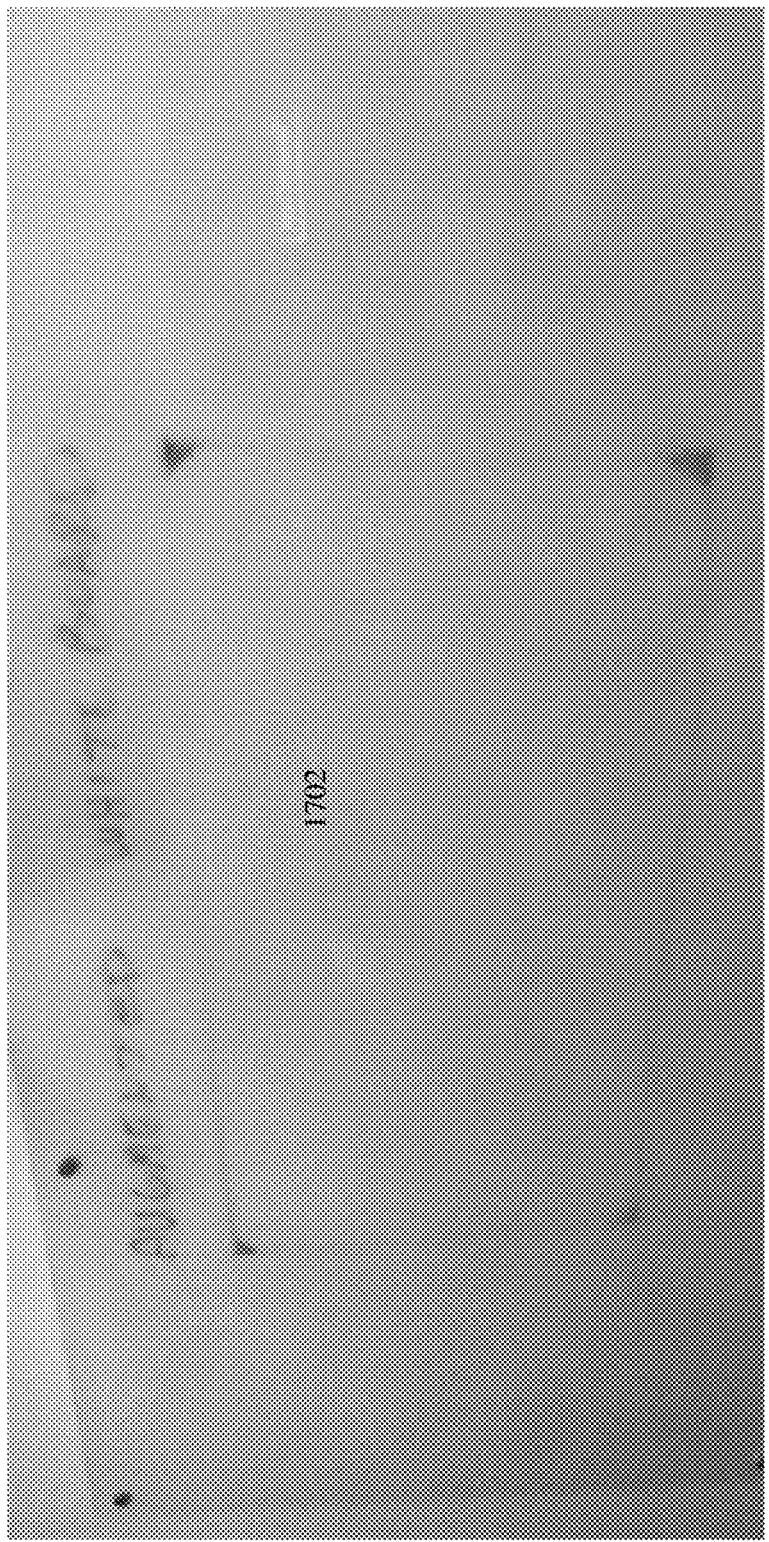

FIGS. 17A-17E illustrate an example implementation of the present disclosure and include a whiteboard. As shown in FIG. 17A, a physical whiteboard 1702 that is located in a conference room is shown, as is a virtual representation of the whiteboard 1704, which is provided as a function of augmented reality. The whiteboard 1704 is provided to all participants (whether remotely or physically located), as function of any respective computing device that is configured to provide an augmented reality, virtual representation. Any of the participants can interact via the virtual whiteboard 1704, including to draw on their respective computing devices, and the virtual whiteboard 1704 is provided to each of the members in the updated state. For example, FIG. 17B illustrates the virtual whiteboard 1704 in the same state as the physical whiteboard 1702 because no participant has updated the virtual whiteboard 1704, such as by drawing on it physically or virtually. FIG. 17C illustrates the virtual whiteboard 1704 in an updated state. Markings 1706 are made by a participant (whether or not located remotely), using the participant's respective computing device showing the whiteboard 1704. FIG. 17D illustrates the whiteboard 1704 in a further updated state with additional markings 1706, which can be made by the one participant or by one or more of a plurality of participants using respective computing device(s). Regardless, the physical whiteboard 1702 remains unchanged, as shown in FIG. 17E. In this way, virtual collaboration is provided as a function of augmented reality and in connection with physically located objects, such as whiteboard 1702.

In addition, physical markings, such as on whiteboard 1702, can be integrated with a virtual whiteboard (e.g., whiteboard 1704). For example, based on the geometry of the board, an image of the whiteboard 1702 can be adjusted (e.g., distorted) to appear as a flat image, and then superimposed essentially as a background image on the existing collaborative virtual whiteboard 1704. The superimposed image of the whiteboard 1702 can be further processed, such as to ensure that the background is truly white, as opposed for example to a shade of grey, to ensure proper blending into the virtual whiteboard 1704. Blending processes can be used to eliminate the white portion of the image, with just the (e.g., black) writing being extract and then added to the virtual board 1704. Blending processes are usable, for example, to remove backgrounds and to extract just markings (e.g., writings and drawings) from a whiteboard, and to provide the extracted markings virtually in whiteboards that are digitally represented. For example, as a user physically writes on a whiteboard, a stream of video content (e.g., via a camera) is generated. The background of the video content (e.g., the blank whiteboard portion) is removed and the extracted writing is transmitted to a computing device to be used in an augmented reality version of a whiteboard. In this way, two physical whiteboards can be kept synchronized, as markings from one whiteboard can be displayed virtually on another whiteboard, and vice-versa.

In one or more implementations, a virtual control panel can be provided for users of user computing devices to define settings for writing/drawing on a virtual whiteboard. For example, a control panel can be provided for a user to select a line width, transparency, color, or other features. Once selected, the user can write/draw on a computing device, such as in a location on the device's display wherein a whiteboard is provided. Once the location of a virtual whiteboard in a scene is determined, such as described herein, the user's marking of the whiteboard can be represented as the user writes/draws with a finger, stylus, or other suitable tool in that respective location. The appearance of the writing/drawing can be defined as a function of selections made in the respective control panel, such as in connection with the line width, color, transparency, or the like.

In one or more implementations, machine learning is usable to detect various objects in video content, such as a whiteboard, chairs, tables, lamps, and people. Once detected, the respective planes of the respective objects can be defined for manipulating the objects in virtual environments. Alternatively, or in addition, a graphical user interface operating on a user computing device can be provided for a user to select or define (via boxes, circles, or other predefined or free-form selection shapes) the respective objects. Thereafter, the objects and their respective planes can be identified and defined by a processor executing one or more software instructions, and the objects can be manipulated, virtually, including as shown and described herein.

Figure 18A:
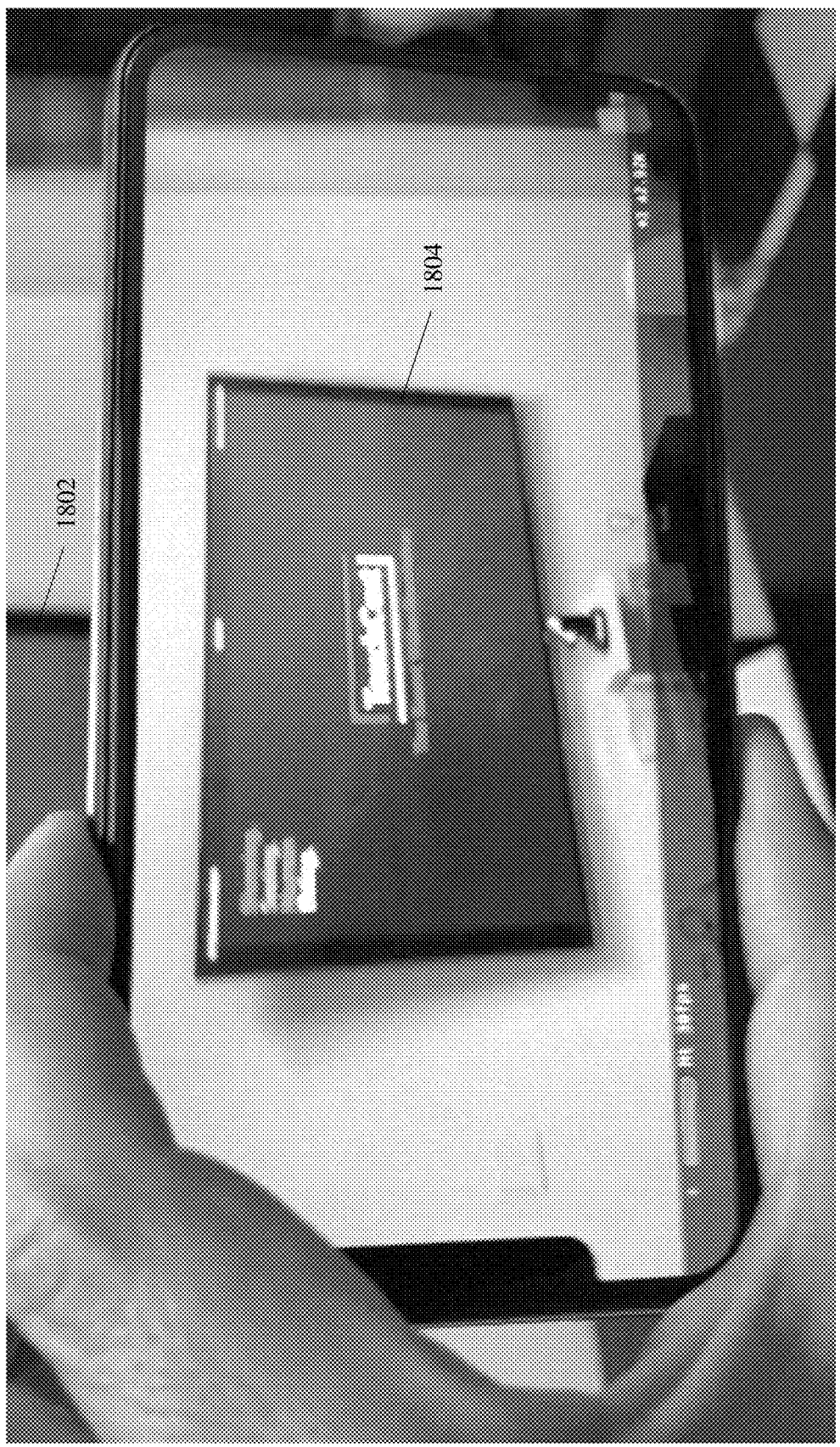
Figure 18B:
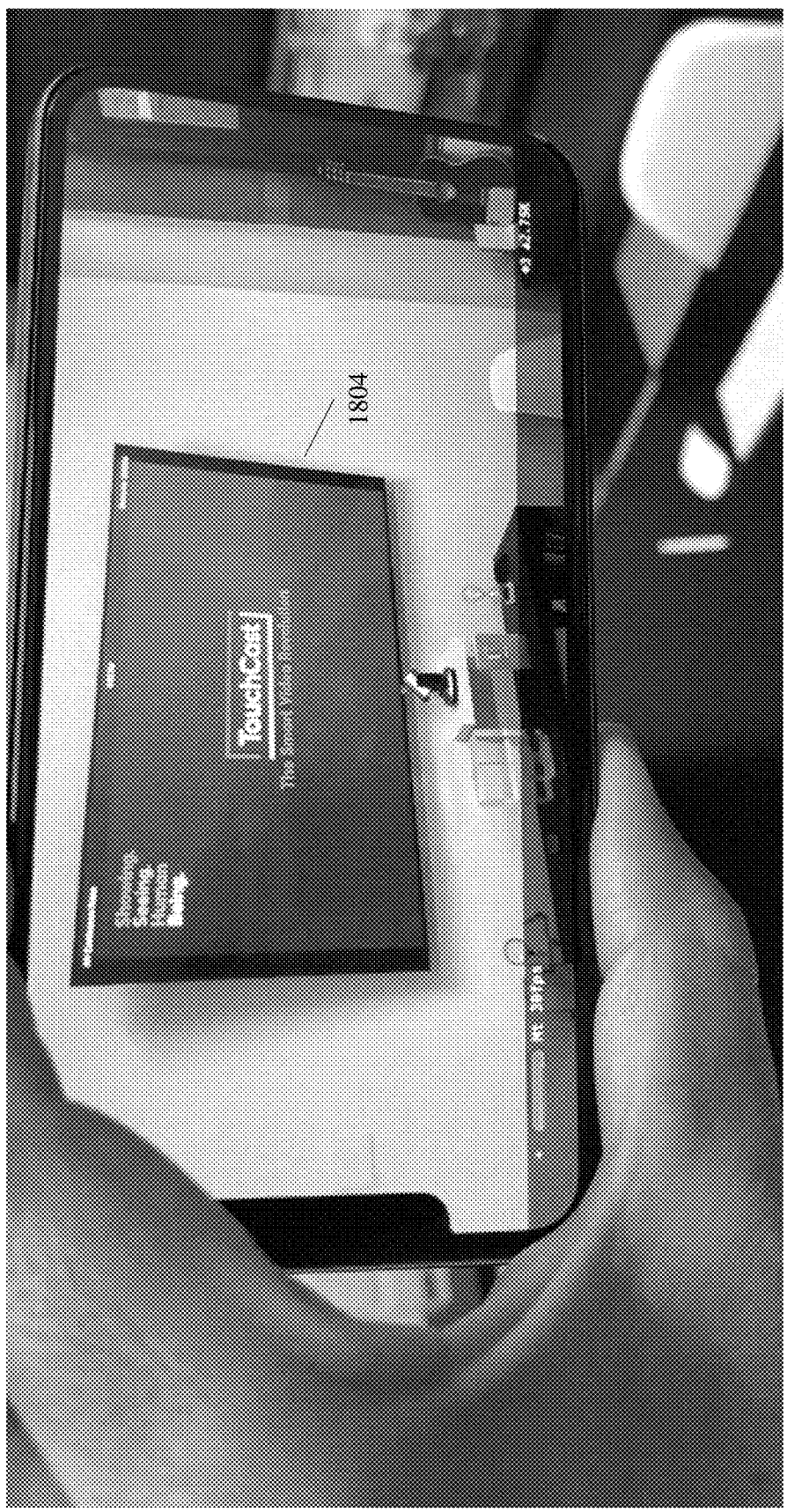
Figure 18C:
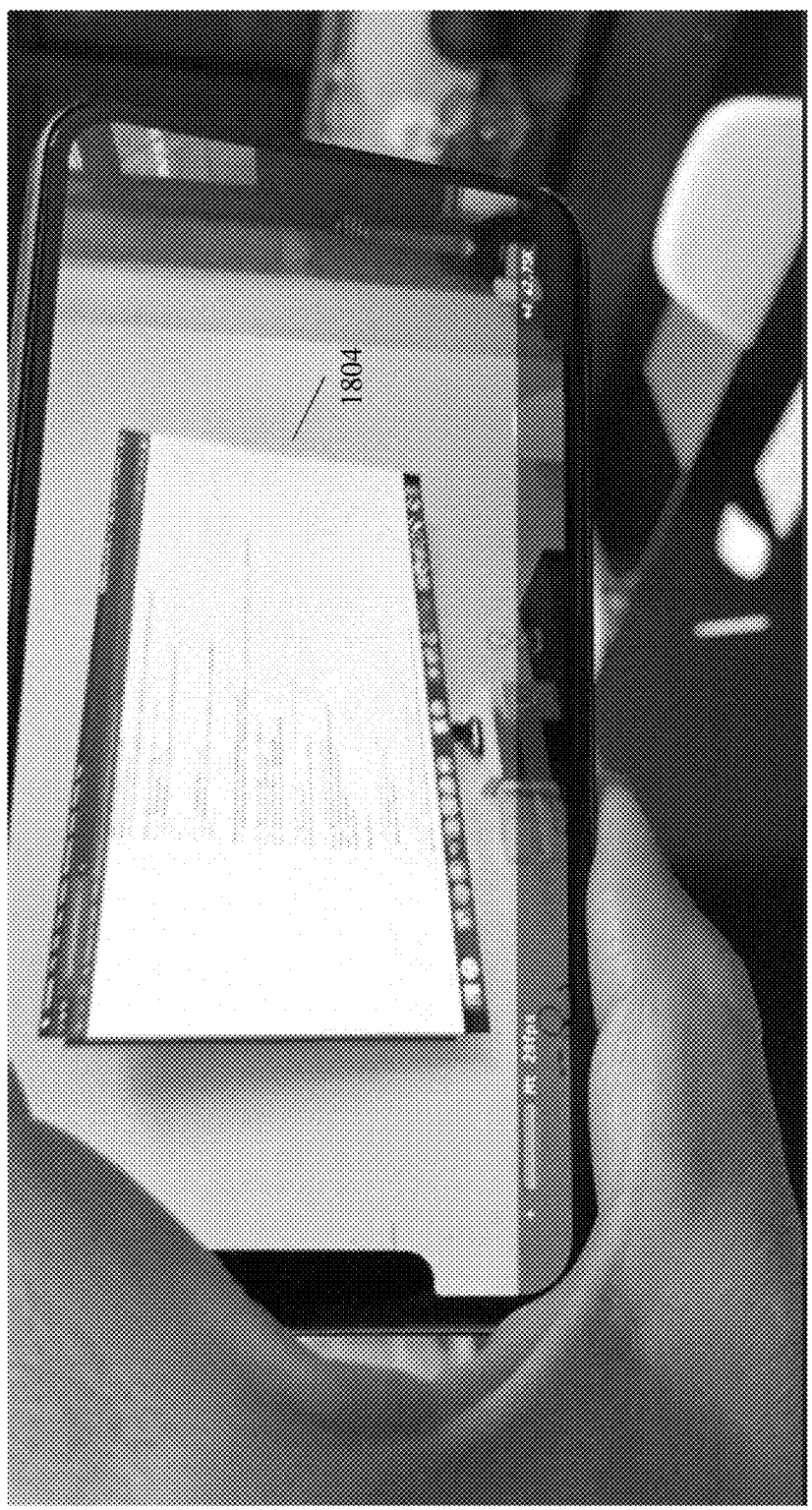

FIG. 18A illustrates a physical display device 1802, which is represented virtually on a participant's computing device as virtual display device 1804. While virtual display device 1804 is represented substantially in the same state as physical display device 1802 in FIG. 18A, it is possible for any respective participant to alter the content displayed on virtual display device 1804. For example, FIG. 18B illustrates virtual display device 1804 in a first state (which is substantially the same as physical display device 1802). FIG. 18C illustrates virtual display device 1804 showing completely different content, which can be a respective participant's computing device or other display. In this way, content on a respective display device can be altered substantially in real time and virtually as a function of augmented reality.

Figure 19A:
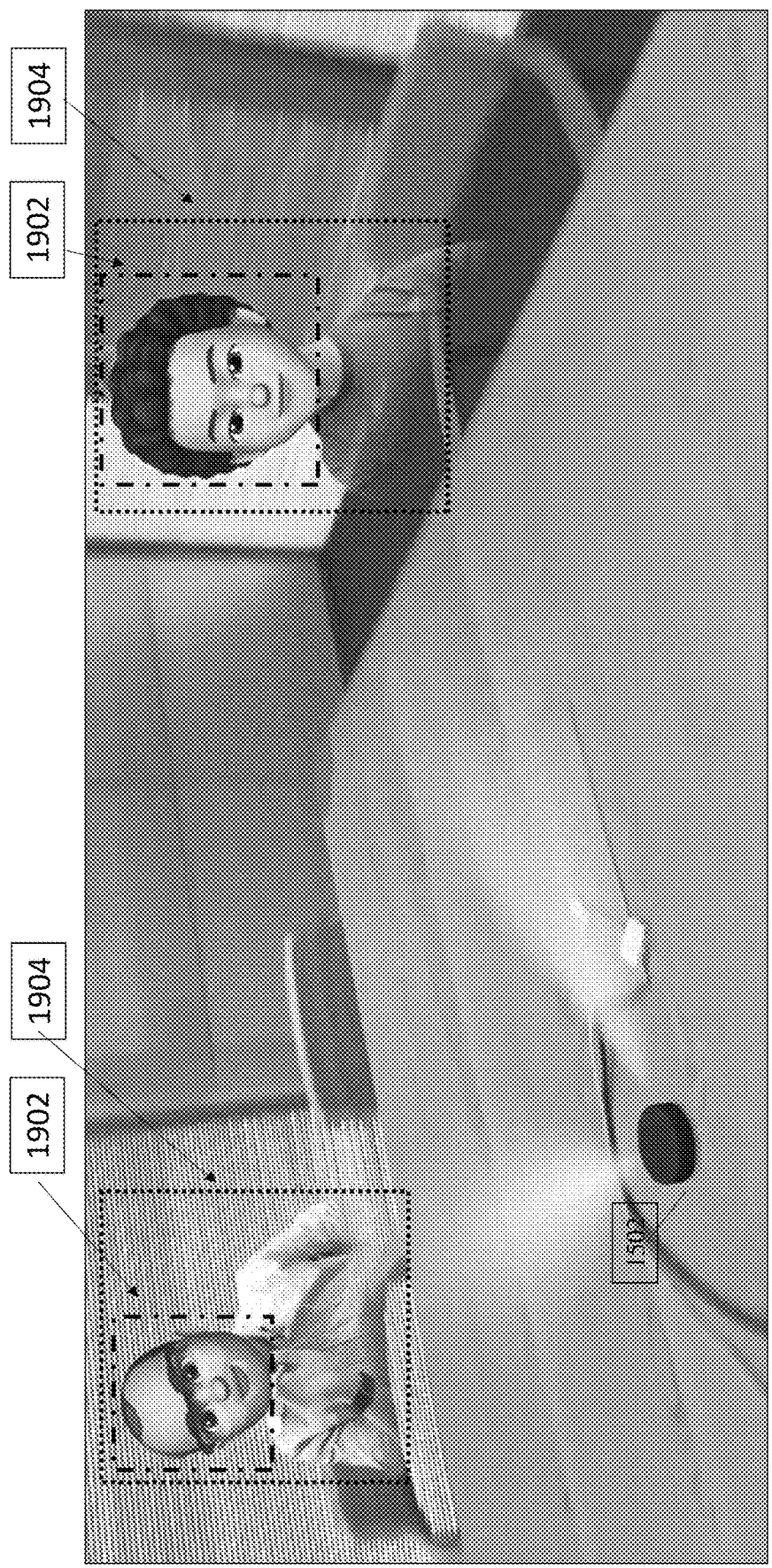

With reference now to one or more implementations, FIG. 19A illustrates an example implementation of the present disclosure configured to project composite representations of the remotely located persons. In one arrangement, the composite representation provided is that of the participants, including remotely located persons depicted in FIGS. 13 and 14. For example, each of the composite representations includes a user representation portion 1904 and a generated portion 1902. The user representation portion 1904 includes, in one or more implementations, the representation of the remote user as described and depicted in FIGS. 9, 13 and 14. The user representation portion 1904 matches the user's movements and/or orientation that occur, such as in the remote location. For example, when the remote user gestures or moves his/her head, the user representation portion 1904 provides a corresponding depiction.

In one or more configurations, the user representation portion 1904 only depicts a portion of the remote user. For example, the user representation portion 1904 depicts the body of the remote user, but not the head of the user.

As further shown in FIG. 19A, the generated portion 1902 is an artificial, synthetic or computer-generated image or representation that is displayed along with the user representation portion 1904. In one arrangement, the generated portion 1902 is an avatar, image, computer generated image or animation, icon or other similar type of visual construct. In one arrangement, the generated portion 1902 can be animated or altered based on data received from one or more sources.

In a further arrangement shown in FIG. 19A, multiple generated portion(s) 1902 are depicted such that multiple remote users are each provided with an individual generated portion 1902 associated with the corresponding user representation portion 1904. Alternatively, not every user representation portion 1904 need be associated with a generated portion. In one arrangement, each generated portion 1902 is the same. In an alternative arrangement, different generated portions 1902 can be assigned to different remote users. Here, each generated portion 1902 can be automatically assigned to a user representation portion 1904 based on a roster of available generated portions 1902. Alternatively, the user can provide a desired generated portion 1902 to be used in the corresponding depiction of the user representation 1904.

As shown in FIG. 19A, the generated portion 1902 is presented as an overlay of a portion of the user representation portion 1904. In one arrangement the generated portion overlays the entire user representation 1904. In the depicted configuration, the generated portion 1902 is positioned so as to obscure the head of the user as depicted in the user representation portion 1904. The generated portion 1904 is moved or altered so as to track the position of the user's head so that the user's head is not visible during the composite representation.

Figure 19B:
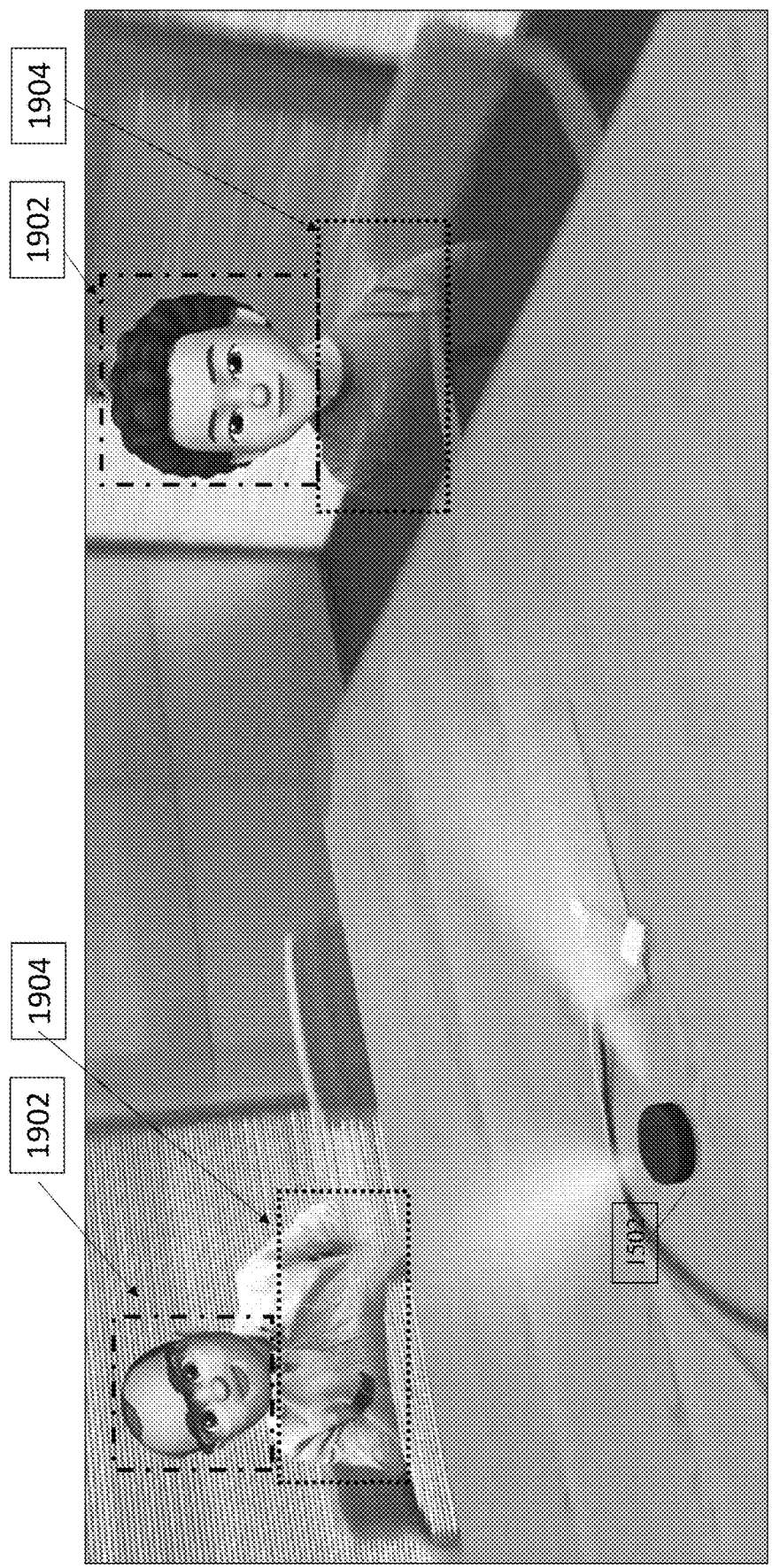

As shown in FIG. 19B, where the user representation portion 1904 does not include a complete representation of the user, such as the user representation portion is only a depiction of the user from the neck down. Here the generated portion 1902 does not overlay the user representation portion 1904, instead, the generated portion 1902 is aligned with a relevant user marker or location in the user representation portion 1904. For instance, when the generated portion 1902 is depicted as an animated face and head, the generated portion 1902 is aligned with the neck of the user depicted in the user representation portion 1904.

As shown in FIGS. 19A-B, a projection device, such as projection device 1502 may be used to generate and/or project representations of the remotely located persons.

Figure 19C:
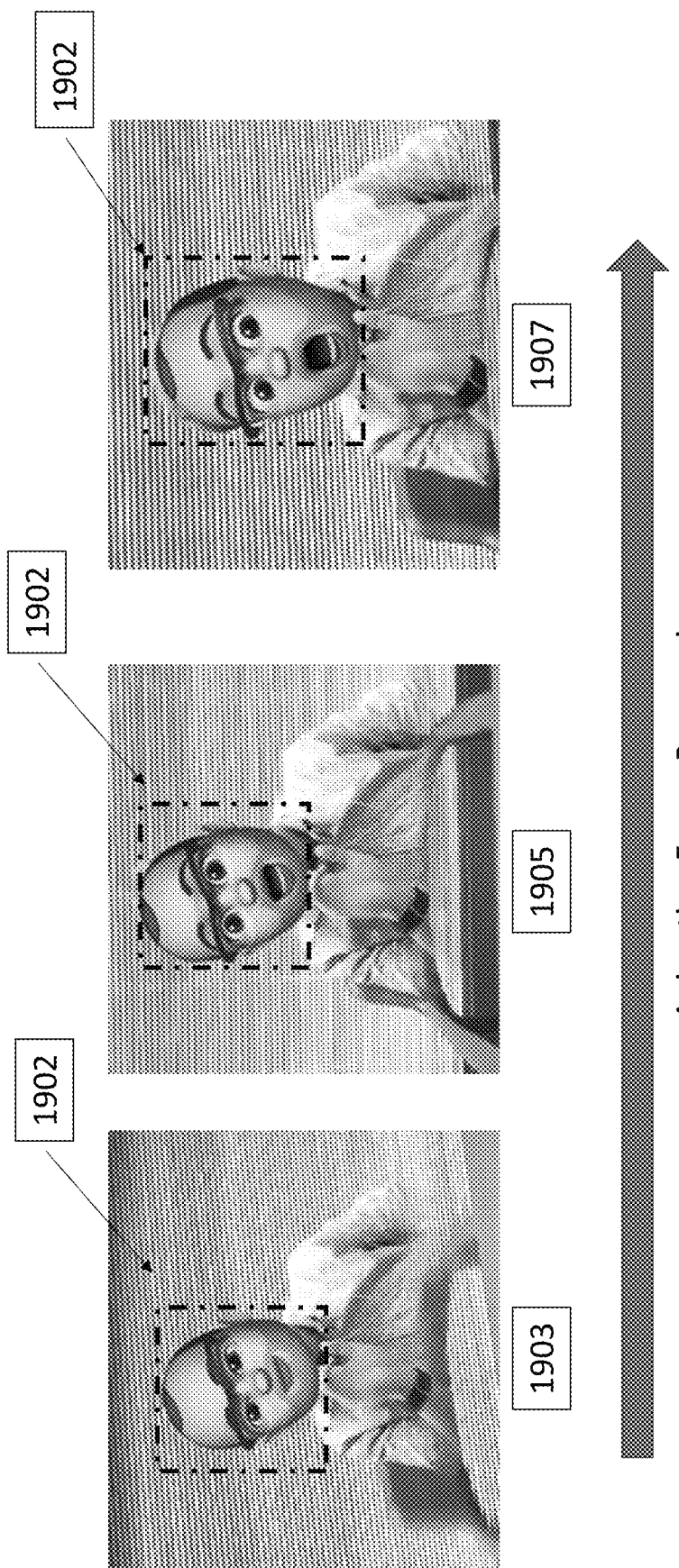

As shown in FIG. 19C, where the generated portion 1902 is a computer-generated head and face, the facial arrangements can be altered to mimic facial arrangements of the remote user. By way of non-limiting example, the state of the user's face, such as smiling, frowning, closing one's eyes, or speaking, can be mimicked by the generated portion 1902. For example, the animation frame progression depicted in key frames 1903-1907 tracks the facial arrangement and/or movements of the remote user. Here, the shape, size or orientation of the remote user's facial features are mimicked by the generated portion 1902.

Figure 19D:
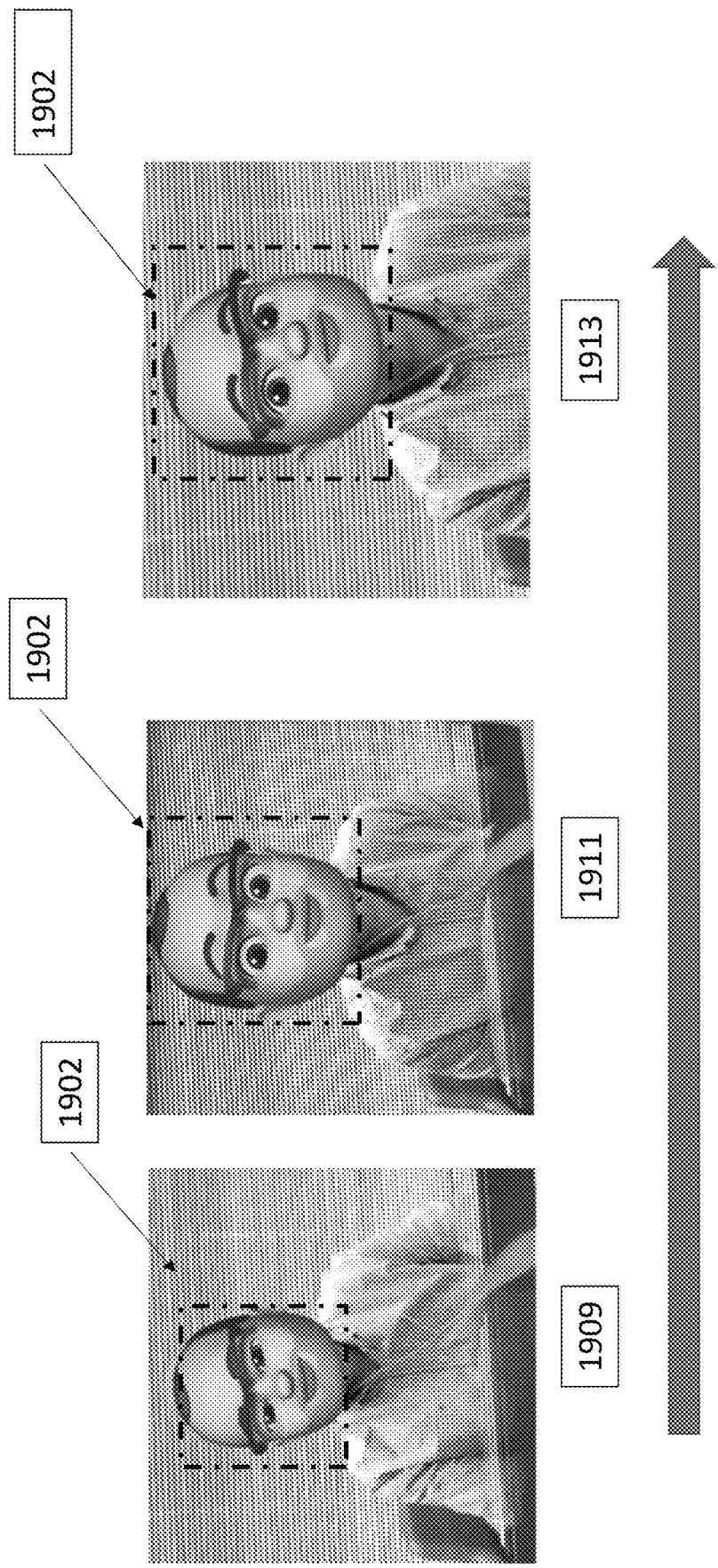

In yet a further depiction, as shown in FIG. 19D, the generated portion 1902 tracks the relative position, size and orientation of some or all of the user representation portion 1904. By way of non-limiting example, the generated portion 1902 is able to maintain proper scaling of the depicted avatar based on the proximity of the user to a viewer for a display device. For instance, where a user moves closer to the viewer, the generated portion 1902 increases, in proportion, based on the distance depicted between the user and the viewer of the display device. For example, the animation frame progression depicted in key frames 1909-1913 provides that the relative size of the generated portion 1902 increases or decreases relative to the viewing frame, depending on the proximity of the user to the viewer of the display device. As illustrated in the animation frames, as a user moves towards the viewer of the display device, the apparent size of the generated portion 1902 will increase dynamically so as to match the proportions of the user representation.

Figure 20:
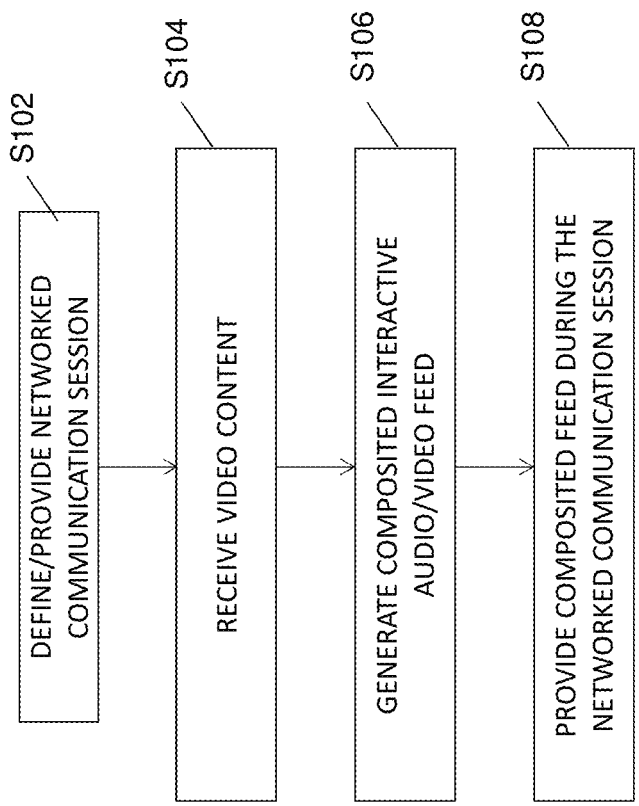
FIG. 20 is a flowchart identifying steps associated with an implementation of the present disclosure.

FIG. 20 is a flowchart illustrating steps associated with an implementation of the present disclosure, in which an augmented reality virtual videoconference for each of a plurality of computing devices during a networked communication session is provided. At step S102, the networked communication session is defined and provided a plurality of devices. At step S104, video content that is at least partially captured by a camera associated with a respective device is received. At step S106, a composited interactive audio/video feed comprised of audio/video input received during the networked communication session from each of the first user computing device and at least the respective user computing device of the one of the additional users is generated. At least some of the video content captured by the camera associated with a respective user computing device is removed prior to including the remaining video content in the composited interactive audio/video feed. At step S108, the composited interactive audio/video feed is provided to the plurality of computing devices during the networked communication session.

Thus, as shown and described herein, technological solutions are provided to the problem of providing real presence over virtually any distance.

Although many of the examples shown and described herein regard providing augmented reality in a videoconferencing environment, the invention is not so limited. Moreover, although illustrated embodiments of the present disclosure have been shown and described, it should be understood that various changes, substitutions, and alterations can be made by one of ordinary skill in the art without departing from the scope of the present disclosure.

What is claimed is:

1. A system for providing an augmented reality virtual videoconference for each of a plurality of computing devices during a networked communication session, the system comprising:
   non-transitory processor readable media;
   at least one processor operatively coupled to the non-transitory processor readable media, wherein the non-transitory processor readable media have instructions that, when executed by the at least one processor, causes the at least one processor to perform the following steps:
      receive initialization information from a computing device, wherein the initialization information includes video content of a room captured by a camera configured with the computing device;
      process the initialization information to detect objects in the room, wherein at least one of the detected objects is a whiteboard;
      provide respective access to a networked communication session to each of a plurality of computing devices, wherein at least one of the computing devices is respectively operated by a user physically located out of the room and at least one of the respective computing devices is respectively operated by a user physically located in the room;
      receive, during the networked communication session from at least one computing device respectively operated by a user physically located in the room, video content;
      generate a composited interactive video feed comprised of the video content received from the at least one computing device respectively operated by a user physically located in the room and video content received during the networked communication session from each of at least one computing device respectively operated by a user physically located out of the room;
      revise, during the networked communication session, the composited interactive video feed by replacing at least part of an appearance of at least one of the detected objects with at least some video content received during the networked communication session from one of the computing devices respectively operated by a user physically located out of the room and further revise, by the at least one processor, during the networked communication session, the composited interactive video feed by altering an appearance of the whiteboard; and
      provide the revised composited interactive video feed to the plurality of computing devices during the networked communication session.

2. The system of claim 1, wherein the non-transitory processor readable media have further instructions that, when executed by the at least one processor, causes the at least one processor to:
   process the initialization information to detect corresponding information associated with the detected objects.

3. The system of claim 2, wherein the detected objects and corresponding information includes at least one plane of the object.

4. The system of claim 2, wherein the non-transitory processor readable media have further instructions that, when executed by the at least one processor, causes the at least one processor to:

use machine learning to process the initialization information.

5. The system of claim 4, wherein the machine learning can be implemented for at least image processing.

6. The system of claim 1, wherein the non-transitory processor readable media have further instructions that, when executed by the at least one processor, causes the at least one processor to:

provide an augmented reality view of the remaining video content in the composited interactive audio/video feed as a function of movement of a viewer of the composited interactive audio/video feed.

7. The system of claim 6, wherein the augmented reality view includes adjusting for skew and angle of view.

8. The system of claim 1, wherein at least one of the additional user computing device(s) communicate on the networked communication session via one or more of Real Time Streaming Protocol, Web Real-Time Communication and/or hypertext transport protocol live streaming.

9. The system of claim 1, wherein the non-transitory processor readable media have further instructions that, when executed by the at least one processor, causes the at least one processor to:

receive from the additional user computing devices information representing an interaction by the one of the user computing devices; and provide a representation of the interaction to each other user computing device.

10. A method for providing an augmented reality virtual videoconference for each of a plurality of computing devices during a networked communication session, the method comprising:

receiving, by at least one processor, initialization information from a computing device, wherein the initialization information includes video content of a room captured by a camera configured with the computing device;

processing, by the at least one processor, the initialization information to detect objects in the room, wherein at least one of the detected objects is a whiteboard;

providing, by the at least one processor, respective access to a networked communication session to each of a plurality of computing devices, wherein at least one of the computing devices is respectively operated by a user physically located out of the room and at least one of the respective computing devices is respectively operated by a user physically located in the room;

receiving, by the at least one processor during the networked communication session from at least one computing device respectively operated by a user physically located in the room, video content;

generating, by the at least one processor, a composited interactive video feed comprised of the video content received from the at least one computing device respectively operated by a user physically located in the room and video content received during the networked communication session from each of at least one computing device respectively operated by a user physically located out of the room;

revising, by the at least one processor during the networked communication session, the composited interactive video feed by replacing at least part of an appearance of at least one of the detected objects with at least some video content received during the networked communication session from one of the computing devices respectively operated by a user physically located out of the room and further revising, by the at least one processor, during the networked communication session, the composited interactive video feed by altering an appearance of the whiteboard; and providing, by the at least one processor, the revised composited interactive video feed to the plurality of computing devices during the networked communication session.

11. The method of claim 10, further comprising:
processing, by the at least one processor, the initialization information to detect corresponding information associated with the detected objects.

12. The method of claim 11, wherein the detected objects and corresponding information includes at least one plane of the object.

13. The method of claim 11, further comprising:
using, by the at least one processor, machine learning to process the initialization information.

14. The method of claim 13, wherein the machine learning can be implemented for at least image processing.

15. The method of claim 10, further comprising:
providing, by the at least one processor, an augmented reality view of the remaining video content in the composited interactive audio/video feed as a function of movement of a viewer of the composited interactive audio/video feed.

16. The method of claim 15, wherein the augmented reality view includes adjusting for skew and angle of view.

17. The method of claim 10, wherein at least one of the additional user computing device(s) communicate on the networked communication session via one or more of Real Time Streaming Protocol, Web Real-Time Communication and/or hypertext transport protocol live streaming.

18. The method of claim 10, further comprising:
receiving, by the at least one processor, from the additional user computing devices information representing an interaction by the one of the user computing devices; and
providing a representation of the interaction to each other user computing device.

* * * * *